United States Patent
Angelsen et al.

(10) Patent No.: US 7,273,455 B2
(45) Date of Patent: Sep. 25, 2007

(54) CORRECTIONS FOR WAVEFRONT ABERRATIONS IN ULTRASOUND IMAGING

(76) Inventors: Bjørn A. J. Angelsen, Bugges veg 4B, 7051 Trondheim (NO); Tonni F. Johansen, Nils Uhlin Hansens veg 50C, 7026 Trondheim (NO); Trond Karsten Varslot, Vådanveien 4E, 7024 Trondheim (NO)

( * ) Notice: Subject to any disclaimer, the term of this patent is extended or adjusted under 35 U.S.C. 154(b) by 407 days.

(21) Appl. No.: 10/894,387

(22) Filed: Jul. 19, 2004

(65) Prior Publication Data

US 2005/0033170 A1 Feb. 10, 2005

Related U.S. Application Data

(60) Provisional application No. 60/487,903, filed on Jul. 17, 2003.

(51) Int. Cl.
*A61B 8/00* (2006.01)
(52) U.S. Cl. .................. 600/437; 600/443; 600/447; 600/458
(58) Field of Classification Search ................ 600/437, 600/443, 447, 458
See application file for complete search history.

(56) References Cited

U.S. PATENT DOCUMENTS

| | | | | |
|---|---|---|---|---|
| 5,793,701 | A * | 8/1998 | Wright et al. | 367/7 |
| 6,023,977 | A * | 2/2000 | Langdon et al. | 73/629 |
| 6,485,423 | B2 * | 11/2002 | Angelsen et al. | 600/458 |
| 6,682,487 | B1 * | 1/2004 | Savord | 600/443 |
| 6,699,189 | B1 * | 3/2004 | Lin et al. | 600/437 |
| 6,705,993 | B2 * | 3/2004 | Ebbini et al. | 600/443 |
| 6,905,465 | B2 * | 6/2005 | Angelsen et al. | 600/437 |
| 6,951,540 | B2 * | 10/2005 | Ebbini et al. | 600/437 |
| 2004/0254460 | A1 * | 12/2004 | Burcher et al. | 600/437 |
| 2005/0154306 | A1 * | 7/2005 | Burcher et al. | 600/447 |

* cited by examiner

*Primary Examiner*—Eleni Mantis Mercader
*Assistant Examiner*—Michael Rozanski
(74) *Attorney, Agent, or Firm*—Cohen Pontani Lieberman & Pavane LLP

(57) ABSTRACT

An estimation method for correction filters for wavefront aberration correction in ultrasound imaging is given. The aberration is introduced due to spatial variations of the ultrasound propagation velocity in heterogeneous tissue. The correction filters are found as eigenvectors of the cross-correlation matrix of the element signals. In particular, the eigenvectors with a small spatial linear/plane phase component is sought. Detailed methods for calculating the eigenvectors are given.

25 Claims, 8 Drawing Sheets a)

b)

a)

b)

CORRECTIONS FOR WAVEFRONT ABERRATIONS IN ULTRASOUND IMAGING

CROSS REFERENCE TO RELATED APPLICATION

This application claims priority based on U.S. Patent Provisional Application No. 60/487,903 filed Jul. 17, 2003.

BACKGROUND OF THE INVENTION

1. Field of the Invention

The present invention is directed at methods for estimating corrections to reduce the impact which tissue induced wavefront aberration has on the quality of medical ultrasound images. The method hence has applications to all situations were ultrasound imaging is used in medicine, but also other areas where ultrasound imaging is applied.

2. Description of the Related Art

Spatial variations in the acoustic properties (mass density and compressibility) are the basis for ultrasound backscatter imaging of tissue. However, large variations combined with complex tissue structures, degrade the images because of the following effects:

i) Interfaces between materials with large differences in acoustic properties can give rise to multiple reflections of the ultrasound pulse. Such multiple reflections are termed pulse reverberations, and add a tail to the propagating ultrasound pulse. If the multiple reflections have sufficient amplitude, they show up as noise in the ultrasound image.

ii) Variations of the acoustic velocity within the complex tissue structures introduce aberrations of the forward propagating acoustic wavefront. This is referred to as wavefront aberration, or wavefront aberration, and destroys the focusing of the beam mainlobe and increases the beam sidelobes.

The reduced focusing of the beam mainlobe due to wavefront aberration, reduces the spatial resolution of the ultrasound imaging system. The pulse reverberations and the increased beam sidelobe levels caused by wavefront aberration, introduce additive noise in the image, which in turn reduces the ratio between the strongest and the weakest scatterer that can be detected in the neighborhood of each other, defined as the contrast resolution of the image. This noise is termed acoustic noise because it is produced by the transmitted ultrasound pulse. Increasing the power of the transmitted pulse will hence not improve the signal to noise power ratio, contrary to what is found with electronic receiver noise. It is, therefore, a challenge to reduce pulse reverberations and wavefront aberrations, in order to increase the ultrasound image quality in many applications of medical ultrasound imaging.

Previously, in U.S. Pat. No. 6,485,423 B2 of Nov. 26, 2002, and U.S. patent application Ser. No. 10/408,538 now U.S. Pat. No. 6,905,465, descriptions are given of methods to reduce pulse reverberations, and to estimate corrections for wavefront aberration. The estimation is based on the backscattered signal from a point scatterer, or from a uniform distribution of random scatterers that are δ-correlated in the spatial coordinate.

This patent advances these methods by improving estimation of correction filters for wavefront aberration using the backscattered signal from a more general random distribution of scatterers. The method allows reduction of the interference from strong, off-axis scatterers, as well as discrimination between multiple mainlobes of the aberrated transmit-beam.

SUMMARY OF THE INVENTION

The invention presents new methods for correction of wavefront aberrations in medical ultrasound imaging, and particularly methods for estimation of the relevant aberration correction filters. The invention further presents instrumentation to carry through the methods. The methods use an ultrasound transducer array with a two-dimensional (2D) distribution of the elements. In addition to being treated as in a state-of-the-art beam former, the signals from each element are corrected using an aberration correction filter. The correction filter may be approximated by an amplitude and/or delay filter, and are applied to the transmitted and the received waveforms independently. In the following, the general term correction filter is preferred unless there is a need to distinguish between the correction filter and its amplitude and/or delay approximation.

A state-of-the-art beam former for an ultrasound transducer array, assumes that the tissue is homogeneous with a constant ultrasound propagation velocity c. Direction steering and focusing of the beam onto a focal point, given by the vector $r_f$, is obtained by delaying the element signals in the instrument. The appropriate delays are determined for each element such that the sum of the instrument delay and the pulse propagation time from $r_f$ to the element, under the assumption of constant propagation velocity, is the same for all elements. Element signals which are corrected with this instrument delay are here referred to as homogeneously corrected element signals. The corresponding instrument delays are denoted homogeneous delays.

For aberration correction in receive mode, an aberration correction filter is applied to the homogeneously corrected element signal before the signals from each element are added together to create the corrected receive beam former output signal. In transmit mode, the delays and apodization amplitudes of the transmit beam former are set based on the assumption of a constant propagation velocity in the tissue. The signals are then, additionally, filtered using correction filters, before they are transmitted to the transducer elements.

The invention presents a method for estimating the aberration correction filters based on maximizing the power in the aberration-corrected receive beam former output signal. This maximization is achieved by constructing the correction filters from eigenvectors of the correlation matrix of the homogeneously corrected element signals in the temporal frequency domain. The corresponding amplitude and/or delay filter approximation may also be found by direct operation on the element signals in the time domain in an equivalent eigenvector estimation.

Utilizing the eigenvector corresponding to the largest eigenvalue produces the maximum power in the corrected receive beam former output signal. However, using this eigenvector for corrections can focus the beam off the intended beam axis onto for example a strong off-axis scatterer. In order to select the eigenvector that yields the best correction filters, the phase of the eigenvectors must be compared. This phase may be considered a function θ(x,y) when organized according to the physical layout of the elements on the two-dimensional transducer. A phase plane with a unit normal vector a may then be fitted through the points [x,y,θ(x,y)] in the least-mean-square-error sense. This phase plane is here defined as the spatial linear/plane component of the phase. The best correction filter is therefore constructed using the eigenvector with the smallest spatial linear/plane component among those which are associated with large eigenvalues. This ensures that the corrected focus will be as close as possible to the intended focus.

The element signals used to form the correlation matrix, can for example be element signals backscattered from uniformly distributed, random scatterers that are δ-correlated in space, e.g., erythrocytes in blood, scatterers in homogeneous muscle or parenchymatic tissue, or artificially introduced scatterers such as an ultrasound contrast agent. By selecting the eigenvector with the smallest linear/plane phase component, the estimation methods correct for influence of non-uniform scatterer distributions, for example strong point scatterers outside the axis of the intended beam, embedded in a uniform δ-correlated scatterer distribution. With strong pulse reverberation noise in the signal, this should be reduced in the element or sub-aperture signals for best performance of the methods. This is achieved by such methods as described in U.S. Pat. No. 6,495,423 or U.S. patent application Ser. No. 10/408,538, or using the $2^{nd}$ harmonic component of the back scattered signal which contains reduced body wall pulse reverberations.

The eigenvectors can for example be estimated using an iterative scheme which is efficiently computed by correlating the homogeneously corrected element signals with a corrected beam former output signal at every step of the iteration. An orthogonalization scheme is deployed to find the eigenvectors corresponding to the second and third largest eigenvalues. The iterative scheme may be extended to find the eigenvectors associated with any eigenvalue.

The dimensions of the transducer array elements are determined from the beam forming requirement; the variation in propagation distance from the focus to any point on an element surface is less than $\sim\pm\lambda/2$, where $\lambda$ is the wave length of the ultrasound signal in the tissue. When the correlation length of the aberration is much larger than the width of the elements, the number of correction filters may be reduced by combining the homogeneously corrected element signals from groups of neighboring elements before applying the correction filter. Such a group is called a sub-aperture. The signals from each sub-aperture are referred to as sub-aperture signals. The sub-aperture signals are used both in the estimation of the aberration correction filters, and for the aberration correction filtering.

In transmit mode the correction filter is applied to the transmitted signal at each sub-aperture. Subsequently, the sub-aperture signals undergo beam steering delays at each element based on the assumption of constant propagation velocity. When the correction filters are approximated by delay and amplitude corrections, the corrections can with limited increase in complexity be applied on each element transmit-signal.

To reduce the number of wires in the cable between the 2D array and the imaging instrument, electronics may be deployed close to the array (in the probe) for combining neighboring element signals into sub-aperture signals.

For simplicity of notation most of the time no distinction between the possible sub-aperture signals and the homogeneously corrected element signals is being made here. This is possible because the use of sub-aperture signals does not introduce anything conceptually new, and the slight modifications that are needed from an implementation point of view are obvious.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

A. Description of the Problem

Figure 1:
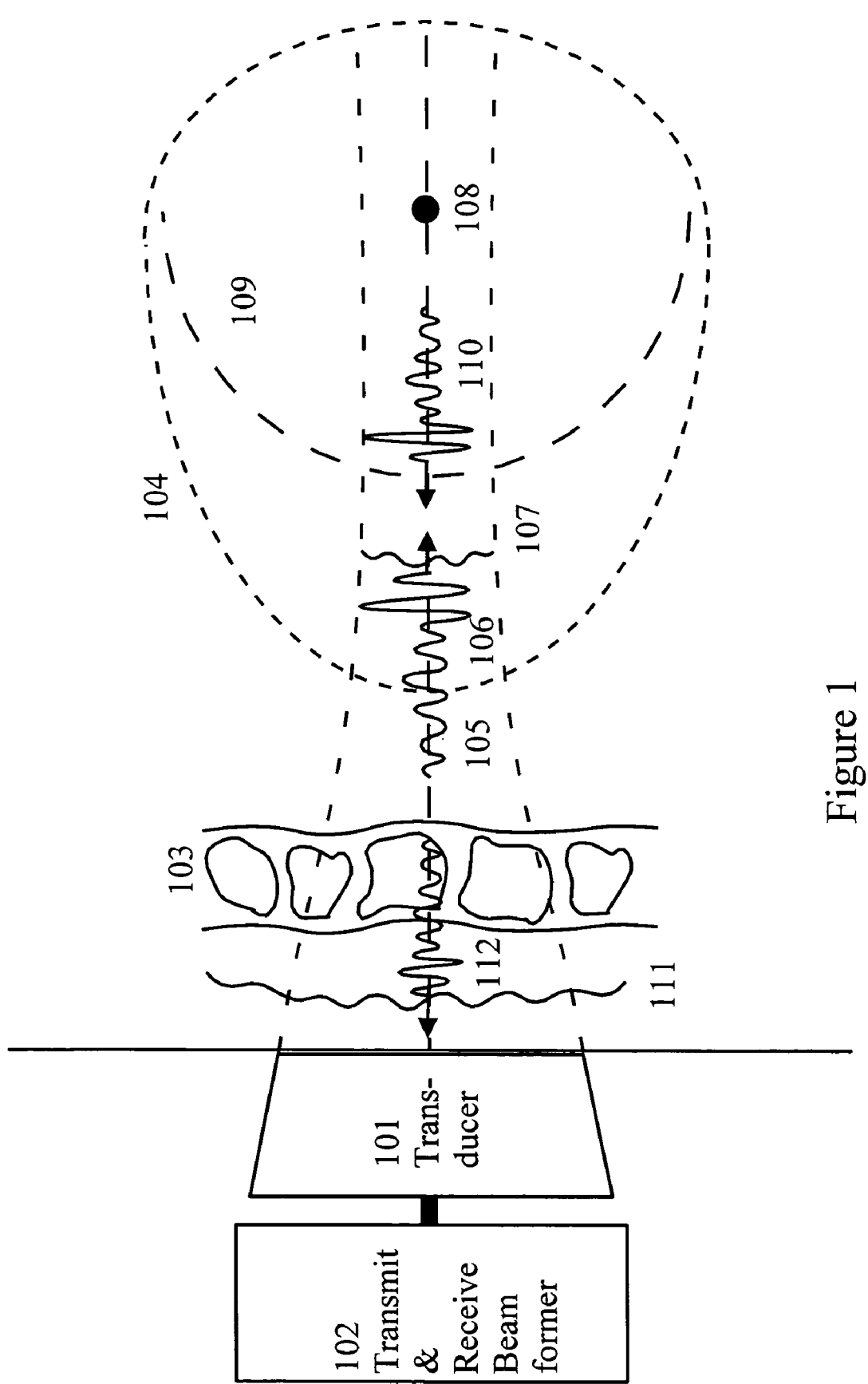
FIG. 1 shows a schematic illustration of pulse reverberations and wavefront aberrations in the body wall.

FIG. 1 shows a typical measurement situation where an ultrasound transducer array (101), driven by a transmit beam former (102), transmits a pulsed and focused ultrasound beam through the body wall (103) towards an object (104) to be imaged. The body wall is a heterogeneous mixture of fat, muscles, and connective tissue with differences in acoustic velocity and characteristic impedance. Multiple reflections within the body wall, and between structures in the body wall and the transducer, produce a reverberation tail (105) to the transmitted pulse (106) as it passes the wall. Similarly, the variations in the acoustic velocity produce aberration of the wavefront (107) as the pulse passes the wall.

When the pulse is reflected by a point scatterer (108) within the object, a wave with spherical wavefront (109) is produced. The relationship between the forward propagating transmit-pulse and the scattered pulse is well described by a second-order temporal differentiation. Therefore, the band limited temporal variation of the pulse with reverberation tail is preserved (110). In passing the body wall on its path back to the transducer array, further aberration of the pulse wavefront (111) occur, and additional reverberations of the pulse are generated (112).

In the linear approximation of wave propagation, all aspects of the propagation is contained in the Green's function. In the temporal frequency domain, the Green's function is $G(\underline{r},\underline{r}_f;\omega)$, and describes the field at a field-point r generated by a unit point source radiating continuous, time harmonic waves with temporal angular frequency $\omega$ from source-point $\underline{r}_f$. The linear approximation is fully adequate for the low amplitude backscattered signal, and is also a good approximation for the propagation of the non-linearly generated harmonic components in the transmitted pulse found with non-linear propagation.

In state-of-the-art methods for focusing and steering of the beam from an array, commonly referred to as beam forming, the tissue is assumed to be homogeneous with a constant ultrasound propagation velocity c. The Green's function for the homogeneous medium is $$G_h(\underline{r}-\underline{r}_f;\omega) = \frac{e^{ik|\underline{r}-\underline{r}_f|}}{4\pi|\underline{r}-\underline{r}_f|} \quad k = \omega/c. \quad (1)$$

This Green's function represents a wave originating at the source point $\underline{r}_f$ with spherical wavefronts centered at $\underline{r}_f$, given by the phase $k|\underline{r}-\underline{r}_f|$. Absorption in the tissue may be modeled by allowing k to be complex, i.e. letting $k = k_r - ik_d$, where $k_r$ is the real part of k and $-k_d$ is the imaginary part of k. In this case $$G_h(\underline{r}-\underline{r}_f;\omega) = L(\underline{r}-\underline{r}_f;\omega)\frac{e^{-ik_r|\underline{r}-\underline{r}_f|}}{4\pi|\underline{r}-\underline{r}_f|} \quad L(\underline{r}-\underline{r}_f;\omega) = e^{-k_d|\underline{r}-\underline{r}_f|}, \quad (2)$$

where L is the loss function due to power absorption determined by the dissipation factor $k_d$. The wave propagation phase velocity is now $c = \omega/k_r$.

Figure 2:
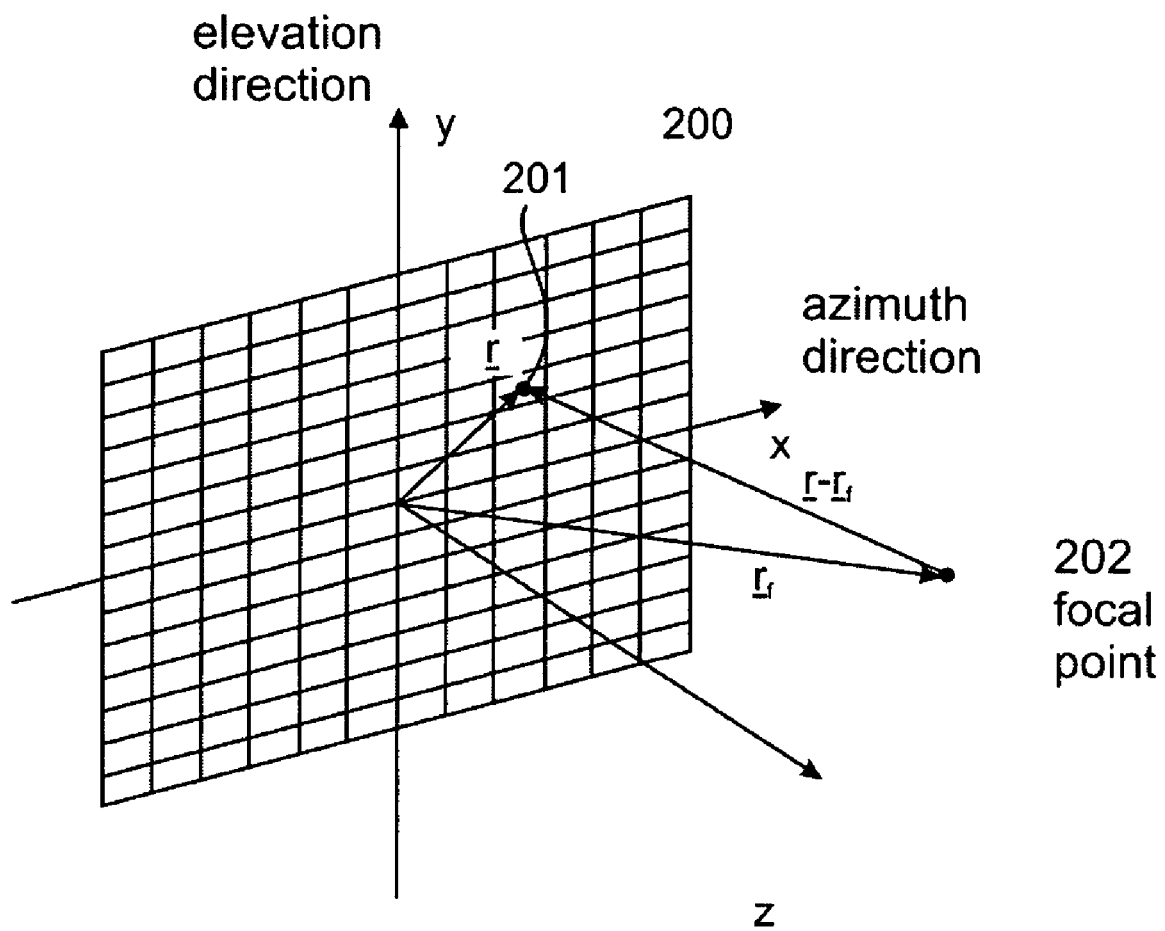
FIG. 2 shows schematically a 2D ultrasound array that is used according to the invention for imaging with pulse reverberation and wavefront aberration correction, indicating the coordinates used to describe the ultrasound field and the element locations.

A schematic drawing of an ultrasound array useful for the aberration correction, is shown as 200 in FIG. 2. The array is composed of elements in a 2D distribution, where 201 indicates one particular element where the center location is described by the vector $\underline{r}$. A Cartesian coordinate system is given for spatial reference, where the x-direction defines the azimuth direction used for 2D scanning as defined below, and the y-direction defines the elevation direction. The vector $\underline{r}_f$ indicates the location of a steered focus of the receive or transmit beam. Thus $|\underline{r}-\underline{r}_f|$ is the distance between the focal point and the element at $\underline{r}$.

The homogeneous delays applied by a state-of-the-art beam former in order to focus, is found by substituting the spherical phase factor in the Green's function of Eq.(1) with the phase factor $kr_f$ for all elements. This is obtained by multiplying the Green's function for the element with center location $\underline{r}$ with the function $e^{ik\{|\underline{r}-\underline{r}_f|-r_f\}}$. Because $k=\omega/c$, this is further equivalent to delaying the signal an amount $\tau(\underline{r},\underline{r}_f)=(|\underline{r}-\underline{r}_f|-r_f)/c$. The homogeneously corrected element signals are thus obtained by time-shifting each element signal by this amount. Additionally, amplitude appodization of the array element signals is often utilized to reduce the beam sidelobe levels.

In the following analysis the Green's function for heterogeneous tissue mixtures is related to the free-space Green's function $G_h(\underline{r}-\underline{r}_f;\omega)$ for the homogeneous material by $$G(\underline{r},\underline{r}_f;\omega) = S(\underline{r},\underline{r}_f;\omega)G_h(\underline{r}-\underline{r}_f;\omega). \quad (3)$$

The function $S(\underline{r},\underline{r}_f;\omega)$ is called the generalized, frequency dependent phase-amplitude screen for the heterogeneous tissue with a point source (scatterer) at location $\underline{r}_f$, and represents the deviation of the wave propagation from that in the assumed homogeneous tissue. It, therefore, describes both phase aberration and pulse reverberations.

Figure 3:
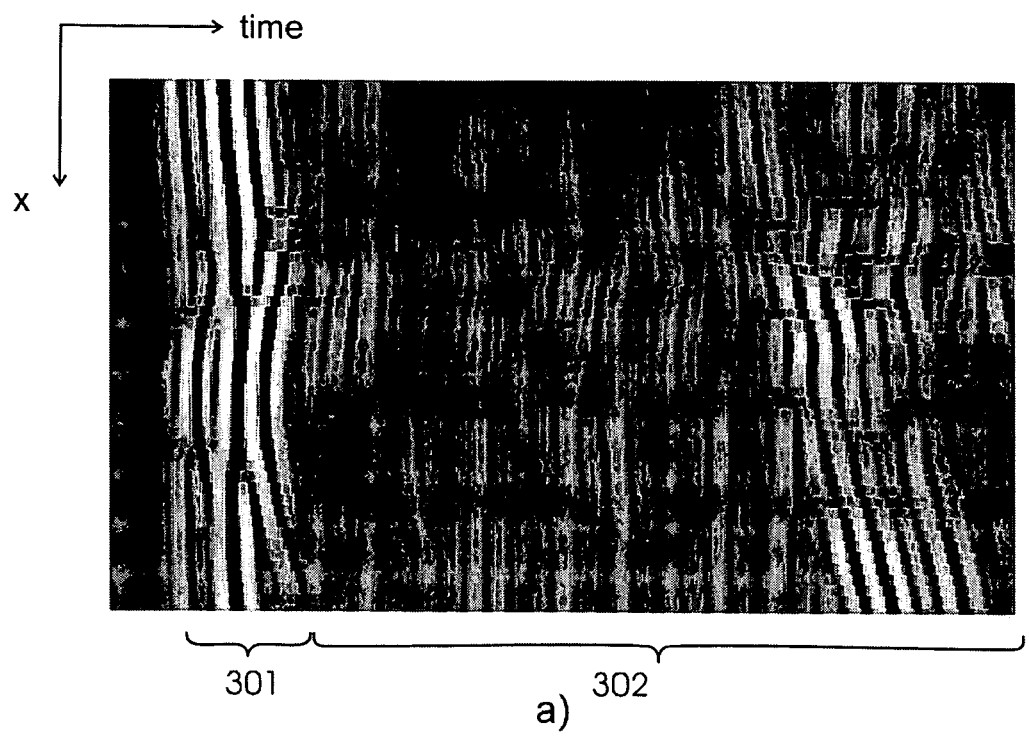
FIG. 3a shows the homogeneously corrected element signals received at the transducer from a point source.
FIG. 3b shows beam profiles obtained when various phase aberration corrections are deployed, compared to the beam profile obtained in a medium with constant propagation velocity.
Figure 3:
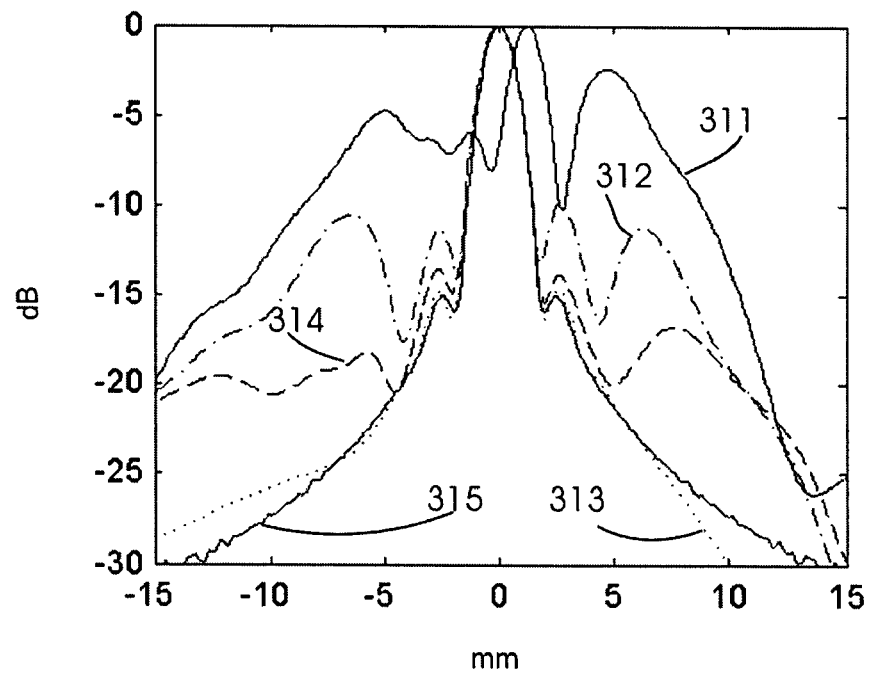

FIG. 3a shows a gray scale plot of a selected portion of the homogeneously corrected element signals received from a point source creating a short pulse at $\underline{r}_f$, band limited in temporal frequency. If $s(\underline{r},\underline{r}_f;t)$ is the inverse temporal Fourier transform of $S(\underline{r},\underline{r}_f;\omega)$, then the plot essentially shows $s(\underline{r},\underline{r}_f;t)$ convolved with the waveform created by the point source.

The deviations of the first part of the signals, shown as 301 in FIG. 3a, from a plane pulse wave represents aberration of the pulse wavefront, and is produced by the forward propagation of the pulse. The pulse reverberations are represented by the tail, shown as 302 in FIG. 3a, and are hence found with large phase angles of $S(\underline{r},\underline{r}_f;\omega)$. By reducing the pulse reverberations, for example according to the methods in the cited patents, the tail is highly attenuated in the received signal. Thus the result is a received element signal which mainly contains the part that stems from the forward propagation of the wave, denoted as 301. This part has undergone wavefront aberration due to spatial variations in the propagation velocity, and is described by a modified screen $\hat{s}(\underline{r},\underline{r}_f;t)$.

When there is no power absorption in the tissue, the wave equation has the property that time-reversed acoustic field is also a solution to the same wave equation [1]. Hence, if the field p(r;t) from a point source at $\underline{r}_f$ is measured for all points r in space up to the time T, the wave p(r;T−t) will converge back towards $\underline{r}_f$. However, it is only possible to measure the field at the transducer surface. This represents the forward propagating wave within the transducer aperture. The wave field inside the tissue which does not reach the transducer is not observed. Transmitting the time-reversed measured signal, p(r;T−t), produces a wave that is focused at $\underline{r}_f$ with the diffraction of the limited array aperture, and is compensated for the forward propagation aberration of the wavefront. As this approach does not time-reverse the field inside the tissue, the retransmitted wave will include pulse reverberations. Methods as the ones described in the above cited patent or patent application, are therefore necessary to reduce the pulse reverberations.

The time-reversed transmission of the forward propagating wave is equivalent to setting up the transmit beam former for focusing onto $\underline{r}_f$ with the homogeneous delays, and then filtering the transmit pulses for the element at location $\underline{r}$ on the transducer surface, illustrated in FIG. 2, using the aberration correction filter $$H(\underline{r},\underline{r}_f;\omega) = \hat{S}^*(\underline{r},\underline{r}_f;\omega). \quad (4)$$

Here * denotes complex conjugation. By reciprocity, one can perform corrections for the wavefront aberration on the received waveform by filtering the homogeneously corrected element signal for the element with center at $\underline{r}$ using $H(\underline{r},\underline{r}_f;\omega)$. In many practical situations, one can approximate the frequency dependent phase-amplitude screen by an amplitude $a_s$ and a delay $\tau_s$, i.e., $$\hat{S}(\underline{r},\underline{r}_f;\omega) \approx a_s(\underline{r},\underline{r}_f)e^{-i\omega\tau_s(\underline{r},\underline{r}_f)}, \quad (5)$$

which gives the following amplitude and delay correction filters $$H(\underline{r},\underline{r}_f;\omega) \approx a_s(\underline{r},\underline{r}_f)e^{i\omega\tau_s(\underline{r},\underline{r}_f)}. \quad (6)$$

When the real wavefront (111) of FIG. 1 is not ideally spherical (plane for 301 in FIG. 3) due to aberrations, the state-of-the-art beam former produces a less than ideal focus of the receiver beam. This is illustrated by the focal beam profile 311 of FIG. 3b. Using corrective delays on the element signals, one is able to produce an improved focal beam profile (312). Further improvements in the beam profile is obtained by additional amplitude corrections of the received element signals according to Eq.(6), shown as 314, while full filtering of the element signals according to Eq.(4) gives the best corrected beam profile, shown as 313. For comparison, the figure also shows the focal beam profile (315) that is obtained for wave propagation in a homogeneous medium.

Power absorption in the tissue produces a frequency dependent attenuation of the wave. Spatially homogeneous power absorption produces a spatially independent but frequency dependent attenuation, that causes a pulse form modification. This modification is the same for all element signals, and may be corrected by inverse filtering of the final output signal of the beam former, with no corrections on the element signal level. Combined with the corrections for spatial variations in the propagation velocity as with the correction filters of Eqs.(4,6), full correction both for spatial variations in propagation velocity and homogeneous absorption attenuation is possible.

Spatial variations of the power absorption in a heterogeneous tissue, has a more complex effect on the amplitude, which mixes with the amplitude variations produced by the heterogeneous wave propagation. If heterogeneous wave propagation produces a low amplitude in S, the correction filter according to Eqs.(4,6) will also have a low amplitude. If heterogeneous absorption produces a low amplitude in the signal for the element at location $\underline{r}$, the correction filter for this element should have a high amplitude. As both wave propagation and heterogeneous absorption simultaneously influences the amplitude of the received signal, the compensation for heterogeneous absorption is difficult to estimate. However, the heterogeneous absorption only affects the amplitude of the correction filters. The most severe aberration of the beam is produced by the phase variations of the generalized screen. This part is compensated for by the correction filters, also in the presence of heterogeneous absorption.

In many situations, the aberrating layers have a net prism effect, producing refraction of the beam direction and shifting the focal point off the intended beam axis. In this case the generalized aberration screen of Eq.(3) will have a spatially plane/linear phase component (as a function of $\underline{r}$ along the array surface) that produces the refraction, and defines the off-axis location of the center of gravity of the aberrated beam profile. Using a point scatterer in the intended focus to estimate the generalized screen, one will observe the plane refraction component in the phase of the estimated screen. However, when the screen is estimated from a uniform, random distribution of δ-correlated scatterers as for example given in U.S. Pat. No. 6,485,423, the expected value of the plane/linear phase component of the estimated screen is zero. The refraction is thus not observable from the transducer. The beam corrected with the complex conjugate of this screen estimate will, therefore, focus the onto the center of gravity of the original, aberrated transmit beam. This is off-set from the intended beam axis by the net refracting prism effect of the aberrating layers. If the estimated screen contains a spatially linear/plane component, for example produced by strong off axis scatterers as described below, this will shift the focal point of the corrected beam relative to the center of gravity of the original aberrated transmit-beam. The current invention has special techniques to deal with spatially linear/plane components in the phase of the correction filter estimates, as discussed below.

Hence, if $\hat{S}(\underline{r},\underline{r}_f; \omega)$ is known, either in its full form as a function of $\omega$, or in its delay and amplitude approximation of Eq.(5), one can correct for the wavefront aberration both in transmit and in receive modes. The challenge is hence to estimate $\hat{S}(\underline{r},\underline{r}_f; \omega)$ or the approximate delay and amplitude corrections. Methods for such estimation are given below.

As the aberration and reverberations have a 2D variation over the transducer array, the correction methods require the use of a two-dimensional array, illustrated as 200 in FIG. 2. The array is composed of a set of individual elements 201 that are on the electrical terminals connected to individual transmitters and receivers, for example illustrated as 403 and 404 in FIG. 4. The dimensions of the elements are determined by a beam forming requirement; the maximal difference in propagation distance between points on the element surface and the focus $\underline{r}_f$, is less than $\sim\pm\lambda/2$, where $\lambda$ is the wave length of the ultrasound pulse in the tissue. This requirement ensures that all elements on the aperture participating to the focus have a radiation opening angle that includes the selected focus $\underline{r}_f$.

Arrays today typically have a one-dimensional distribution of the elements, for direction steering of the beam in a plane in the so-called azimuth direction, shown as the x-direction in FIG. 2. For wide azimuth angular steering of the beam as with phased arrays, the beam forming requirement limits the element azimuth width to less than $\sim\pm\lambda/2$. For limited direction steering of the beam, as with switched arrays, the radiation opening angle of the elements must be sufficient for all elements to adequately irradiate the focus. The element width in these systems is typically $\sim\pm1$-$1.5$ $\lambda$.

To facilitate electronic focusing of the beam in the y-direction, referred to as the elevation direction, one must divide the elements in the elevation direction, as illustrated in FIG. 2. With no direction steering of the beam in the elevation direction, the beam forming requirement on the elements elevation dimension due to elevation focusing only, allows several wave lengths elevation width of the elements. To obtain beam steering in elevation direction, the same requirements are found as for the azimuth direction.

The correlation length of the generalized screen represents a distance over which the screen is essentially constant. This is usually larger than the dimension of the array elements determined from the beam-forming requirement. In order to reduce the number of correction filters, it is therefore possible to form sub-aperture signals prior to correcting the wavefront aberration. These sub-aperture signals are formed by adding together the homogeneously corrected element signals from a group of neighboring elements (the sub-aperture). The linear dimension of each sub-aperture group must then be shorter than the correlation length of the generalized screen, also referred to as the correlation length of the wavefront aberration.

Figure 4:
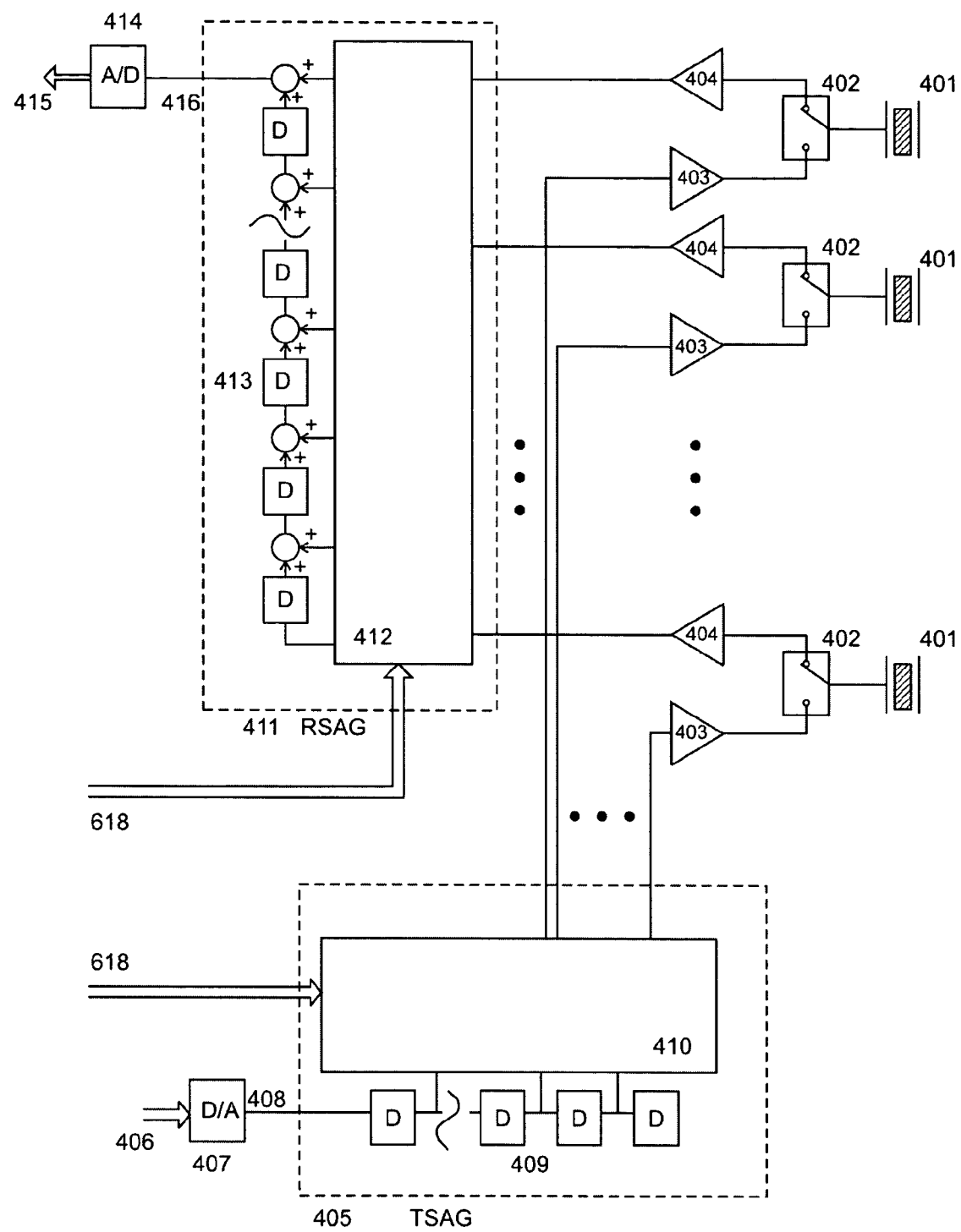
FIG. 4 shows block diagrams of systems for generation of transmit and receive sub-apertures.

An example of such sub-aperture generation is shown in FIG. 4, where 401 indicates a set of neighboring transducer elements, each dimensioned according to the beam forming requirement described above. Each of these elements are connected to one of a set of transmit/receive switches 402, that selects the connection to transmit amplifiers 403 in transmit mode, and receive amplifiers 404 in receive mode.

Figure 5:
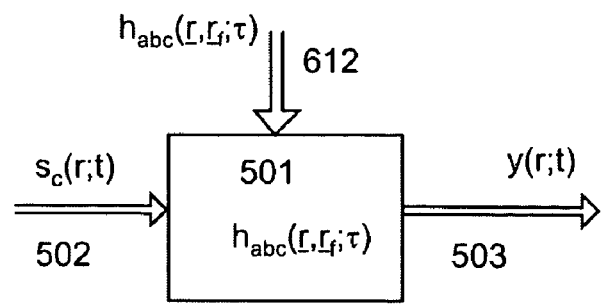
FIG. 5 shows example filtering of the receive and transmit signals for full correction of the wavefront aberration of the transmitted and received waveforms.
Figure 5:
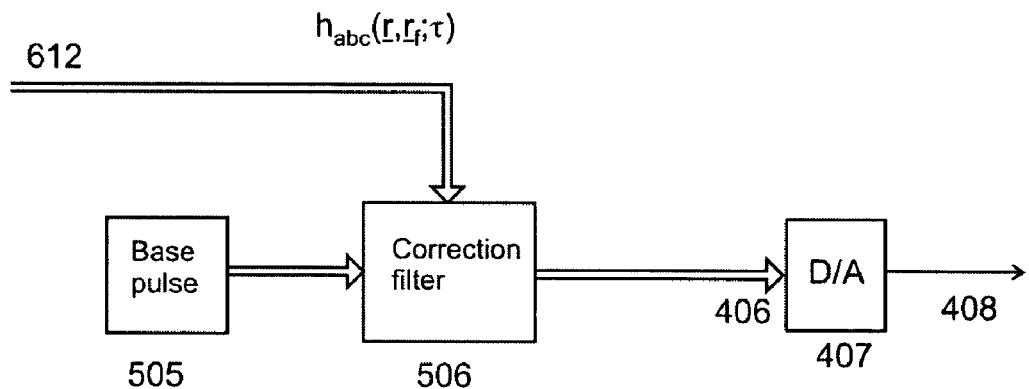

For transmission, FIG. 4 shows by way of example, transmit amplifiers (403) that are driven by a transmit sub-aperture generator (TSAG) (405) that takes the output (408) of the D/A converter (407) as its input. The input (406) to the D/A converter comes from other processing structures in the imaging instrument, for example the transmit correction filter as shown in FIG. 5b. The analog signal (408) is fed through a ladder of delay sections (409) where each block provides a defined delay D of the signal. The cross point switch (410) selects signals with adequate delays of the transmit-signal for the different transducer elements in the sub-aperture, for the direction and focus steering of the sub-aperture beam. The switch (410) is set up with the bus (618), which also can set up variable transmit amplitude for the different elements of the sub-aperture, if amplitude appodization of the transmit-beam is desired.

The outputs of the individual receiver amplifiers in the set 404 are fed to a receive sub-aperture generator (RSAG) (411), where the signals are first fed to a cross-point switch (412) that injects the signals at adequate points of the receive delay network (413). There the output (416) is fed to a receive A/D converter (414) which feeds its digital output (415) to further processing, for example as described in FIG. 6. The RSAG (411) hence provides direction and focus steering of the receive sub-aperture beam. The selection of the delay settings of the cross-point switch (412) is performed via the control bus (618). For reverberation processing of sub-aperture signals, it may in some situations be necessary to receive signals from sub-apertures with different directions in parallel. In this case, the output of the receiver amplifiers (404) may be connected to two receive sub-aperture generators in parallel, each with a separate cross-point switch and a separate delay network and A/D converters.

The sub-aperture receive and transmit delays are calculated for each element under the assumption of constant propagation velocity in the tissue. It is also useful to apply amplitude appodization to the element signals in the sub-aperture transmit and receive generators, to reduce the sidelobe levels of the beam. The amplitude weighting must be calculated in relation to subsequent beam forming for the whole active transmit and receive apertures, as discussed in relation to FIG. 6. The amplitude appodization may for example be set up in the transmit (410) and receive (412) cross-point switches in the circuit in FIG. 4.

In the implementation of FIG. 4, both the transmit (409) and receive (413) delays are implemented using analog techniques. Analog sub-aperture delays allow the use of only one A/D converter (414) and one D/A converter (407) for each sub-aperture generator. In a fully integrated design, one can use a digital implementation of the delays. This requires one A/D converter for each receiver amplifier (404) and one D/A converter for each transmit amplifier (403). However, due to the large number of elements in the 2D arrays, a lower number of bits in each A/D converter is required for this design (e.g. 8-10). A design with one A/D converter for each sub-aperture will typically require 10-12 bits resolution.

B. New Methods

The received signals in a depth range from all elements of the 2D array are recorded for one or more transmitted pulses. In this analysis, the received, homogeneously corrected element signals are arranged as vectors $$y_k(t) = \{y_{1k}(t), \ldots, y_{nk}(t), \ldots, y_{Nk}(t)\}, k=1, \ldots, K$$

where k labels a set of signals for all elements to perform ensemble averaging, n denotes the element number, and t is the echo arrival time after the pulse transmission. The label k may for example denote signals from transmitted pulse number k, where the scatterers in the actual regions decorrelate for each transmitted pulse. The label k can also denote signals from different regions in space with different sets of scatterers. The label k can also denote combined signal from different transmit pulses and different regions in space. For convenience, the element signals are amplitude scaled such that their average amplitude is ~ unity.

The temporal Fourier transforms of the homogeneously corrected element signals are arranged as vectors $$Y_k(\omega) = \{Y_{1k}(\omega), \ldots, Y_{nk}(\omega), \ldots, Y_{Nk}(\omega)\}. k=1, \ldots, K. \quad (7)$$

For further description of the invention, the correction filters of Eqs.(4,6) are arranged as the vector $$\underline{H}(\omega) = \{H_1(\omega), \ldots, H_n(\omega), \ldots, H_N(\omega)\}, \quad (8)$$

where n labels the element number. The aberration corrected receive beam former output signal is generated as a weighted sum of the filter corrected element signals $$B_k^c(\omega) = \Sigma_n w_n H_n(\omega) Y_{nk}(\omega), \quad (9)$$

where $w_n$ is a set of weights for each element signal that is selected for different purposes, for example to produce amplitude appodization to reduce the beam sidelobes. This corrected received beam former signal is used for further image construction.

The essence of the invention is to find the correction filters that maximizes the power of the received, corrected beam former signal averaged over k, i.e., find the filter vector $\underline{H}(\omega)$ that maximizes the functional $$J(\omega) = \frac{1}{K}\sum_k \frac{1}{T_k}|B_k^c(\omega)|^2 - \lambda \sum_n |H_n(\omega)|^2 = \quad (10)$$

$$\frac{1}{K}\sum_k \frac{1}{T_k}\left|\sum_n w_n H_n Y_{nk}\right|^2 - \lambda \sum_n |H_n|^2.$$

Here $T_k$ is the duration of the temporal interval of the signal vector $\underline{y}_k(t)$ used in the estimation. In the last expression the notation of functional dependence on $\omega$ has been dropped. This expression is modified to $$J = \sum_{mn} H_m^* R_{mn} H_n - \lambda \sum_n |H_n|^2 \quad (11)$$

$$R_{mn} = \frac{1}{K}\sum_k \frac{w_m w_n}{T_k} Y_{mk}^* Y_{nk}$$

where the functional dependence on $\omega$ is inherent. The function $R_{mn}(\omega)$ is an estimate of the cross-spectrum between the received signals from element m and n. To reduce the variance in the estimate for limited K and $T_k$, it is generally convenient to smoothen $R_{mn}(\omega)$ over a window around each $\omega$ to obtain a reasonable functional dependence on $\omega$. This is further discussed in relation to Eq.(18).

The stationary points of J with respect to $\underline{H}$ can for each $\omega$ be found from the following eigenvalue problem $$R\underline{H} = \lambda \underline{H} \quad R = \{R_{mn}\}. \quad (12)$$

It is noted that $R_{mn}^* = R_{nm}$, i.e., R is a Hermittian matrix, which implies that all the eigenvalues are real. It further implies that the maximal value of J is obtained for the eigenvector, $\underline{H}^1$, of R associated with the largest eigenvalue, $\lambda_1$. In more detail, the eigenvector $\underline{H}^m$ of R, associated with $\lambda_m < \lambda_{m-1} < \lambda_1$ yields the maximal value of J on the subspace $C^{N-m}$ of $C^N$. spanned by the eigenvectors associated with eigenvalues $\{\lambda_k\}_{k<=m}$. In the following $\underline{H}^m$ will be referred to as the m'th eigenvector, where the ordering $\lambda_m < \lambda_{m-1}$ is implied.

Hence, the different eigenvectors of Eq.(12) will focus the corrected beam in such directions that local maxima for the power of the received, corrected beam former output signal is obtained when deploying the correction according to Eq.(9). This is found by focusing the receive beam onto local maxima of the product of the transmit beam profile amplitude and the strength of the local scatterers.

Consider a situation with an uniform distribution of random δ-correlated scatterers, where the transmit-beam profile in the focal plane has a characteristic main lobe (i.e. all other lobes has less amplitude). The $1^{st}$ eigenvector will then focus the corrected beam onto the transmit-beam mainlobe, while the eigenvectors associated with the smaller eigenvalues will focus the corrected beam in directions that produces local maxima for the power of the received, corrected beamformer signal. If the side lobes in the transmit beam are distinct, the $2^{nd}$ eigenvector will typically focus the corrected beam onto the strongest sidelobe.

Figure 8:
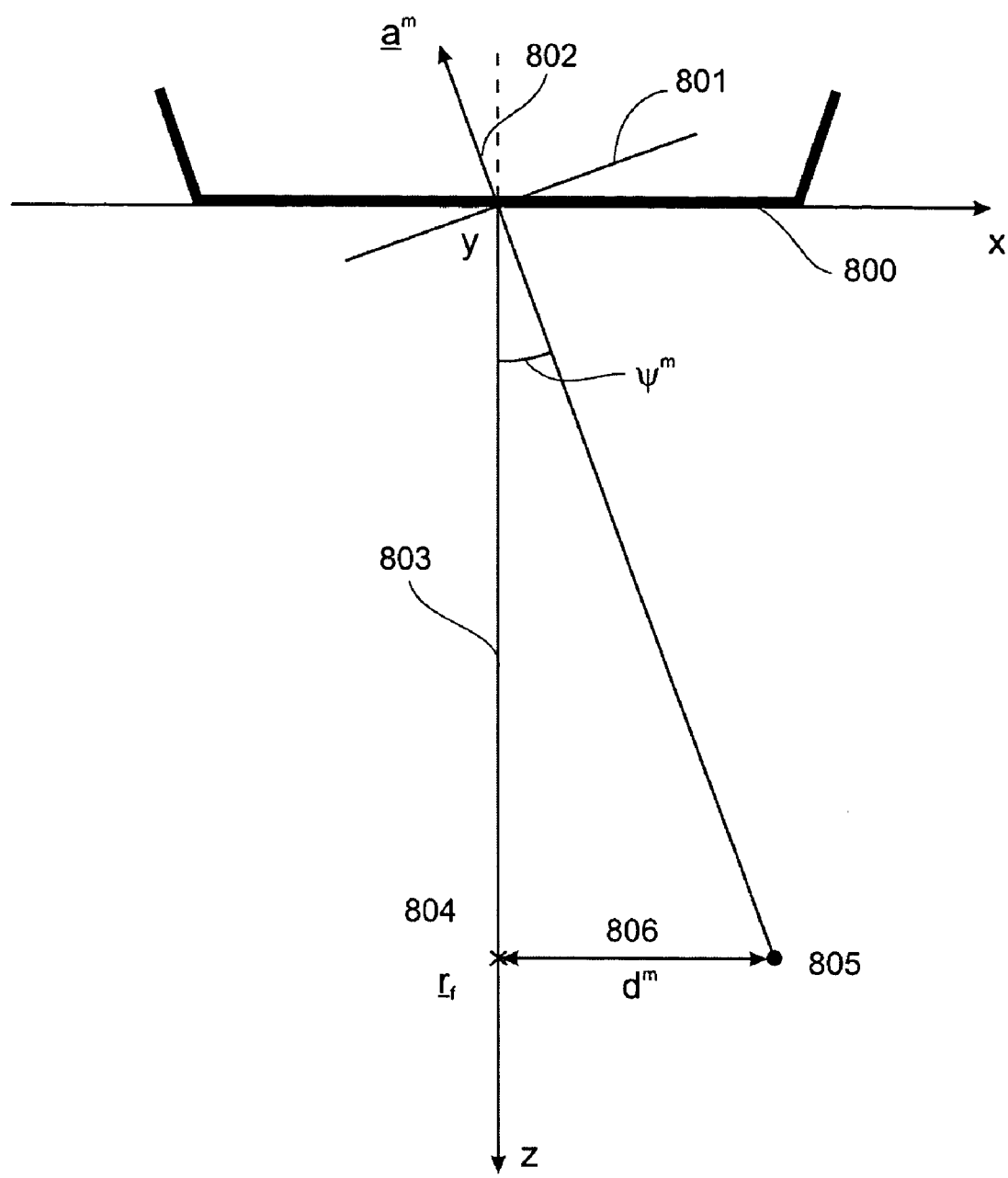
FIG. 8 shows a schematic background for calculation of the magnitude of the spatial linear component in the phase of an eigenvector.

The distance between the peaks of the mainlobe and the strongest sidelobe is found from the magnitude of the spatial linear/plane component in the phase of the eigenvector that focuses the receive beam onto this side lobe. Said spatial linear component of the phase of the correction filter produces a refraction of the corrected beam, as described for S^ above, and it can be extracted from the phase function of the eigenvector between eigenfunction components (spatial variation) as follows:

A 2D plane phase in 3D space may be expressed as an equation $\phi(x,y) = k_\omega a_x x + k_\omega a_y y + \phi_0$, where $\underline{r}=(x,y)$ gives the element center location, $k_{107} = \omega/c = 2\pi/\lambda$ is the wave number of angular frequency $\omega$ with wave length $\lambda$, the unit vector $\underline{a}=(a_x, a_y, a_z)$ where $a_z = \{1-a_x^2-a_y^2\}^{1/2}$ gives the normal to the incoming wave phase to the array surface, as indicated in FIG. 8, where 800 indicates the array surface, 801 indicates the spatially plane component of the eigenvector phase of eigenvector no. m, 802 indicates the unit normal $\underline{a}^m$ to the said spatial linear phase component, with angular direction $\psi^m$ with the transmit beam axis 803 with the transmit focus $r_f$ at 804. The scatterer or scatterer complex, given by the local source maximum (i.e. product of transmit beam amplitude and scatterer strength), that defines the given eigenvector no. m, is located at 805. The distance $d^m$ between the scatterer or scatterer complex that defines the eigenvector and the transmit beam axis is indicated as 806. The direction towards said scatterer or scatterer complex along the array surface is given by the projection of $\underline{a}^m$, $\underline{a}^m \| = (a^m_x, a^m_y)$, onto the array surface.

$\phi_0$ is an offset and can be subtracted initially and is assumed zero in the following calculations. The spatial linear component of the phase can be extracted by a weighted least-mean-square-error fit of the spatial variation (component variation) of the phase of the eigenvector, i.e. minimization of the functional $$J(a_x^m, a_y^m) = \Sigma_{S_t} |H^m(\underline{r};\omega)|^2 (\theta^m(\underline{r};\omega) - k_\omega a_x^m x - k_\omega a_y^m y)^2, \quad (13)$$

where $\Sigma_{S_t}$ denotes summation over element positions $\underline{r}$ for the whole transducer surface $S_t$. The eigenvector number is denoted with m, and $\theta^m$ is the phase of the eigenvector $H^m$. The element labeling has been changed from eigenvector component n to the vector $\underline{r}$ in order to simplify the expression. Minimizing J with respect to $a^m_x$ and $a^m_y$ gives $$a_x^m = \frac{A_{yy}^m B_x^m - A_{xy}^m B_y^m}{A_{xx}^m A_{yy}^m - (A_{xy}^m)^2} \quad A_{x_i x_j}^m = \sum_{S_t} x_i x_j |H^m(\underline{r};\omega)|^2 \quad (14)$$

$i, j = 1, 2 \quad x_1 = x \quad x_2 = y$ $$a_y^m = \frac{A_{xx}^m B_y^m - A_{xy}^m B_x^m}{A_{xx}^m A_{yy}^m - (A_{xy}^m)^2} \quad B_{x_i} = \sum_{S_t} x_i \theta^m(\underline{r};\omega) |H^m(\underline{r};\omega)|^2$$

The magnitude of the spatial linear/plane phase component of said eigenvetor is then measured as the angle $$\psi^m = \sin^{-1}\sqrt{a_x^{m2} + a_y^{m2}} \quad \text{or the distance} \quad (15)$$

$$d^m = r_f \tan \psi^m = r_f \frac{\sqrt{a_x^{m2} + a_y^{m2}}}{\sqrt{1 - a_x^{m2} - a_y^{m2}}} \approx r_f \sqrt{a_x^{m2} + a_y^{m2}},$$

where $\psi^m$ is the angular direction and $d^m$ is the distance to source or source complex at depth $r_f$, defining the eigenvector labeled m. The calculations above has been done for a plane array surface for simplicity of illustration, where it is clear to anyone skilled in the art how to do the calculations for a curved array surface.

The power in the beam former output signal with a receive beam corrected with a given eigenvector is also proportional to the eigenvalue associated to said given eigenvector. For the lower eigenvalues, one generally gets into a situation where the power of the beam former output signal can be increased by a receiver beam width above minimal width of the receive beam determined by diffraction limits. Hence, the power in the receive beam former output signal can in such situations have a local maximum when the width of the receive beam corrected with the associated eigenvector is larger than minimal. One should therefore show care when using eigenvectors associated with lower eigenvalues along the lines discussed below.

In some situations the aberration can be so strong that the main lobe of the aberrated transmit beam profile splits in two lobes with close to the same amplitude. For a homogeneous distribution of random δ-correlated scatterers, the $1^{st}$ eigenvector will focus the corrected beam onto the lobe of the aberrated transmit beam with highest amplitude, while the $2^{nd}$ eigenvector will focus the corrected beam onto the second highest lobe. The distance between the lobe and the intended transmit beam axis, then gives the magnitude of the spatial linear/plane component in the phase of the eigenvector that focuses the receive beam onto this lobe, as described above. If the lobe of the dual main lobe with the highest amplitude has the largest distance from the unmodified beam axis, the $1^{st}$ eigenvector will have a larger spatial linear/plane phase component than the $2^{nd}$ eigenvector. To get the focus of the corrected beam closest to the unmodified beam axis, the eigenvector with the smallest spatial linear/plane component in the phase is selected (i.e. the $2^{nd}$ eigenvector), where said spatial linear component of the phase of this eigenvector is removed and the modified eigenvector used as a correction filter. Such removal of the spatial linear component of the phase of any eigenvector to be used for correction filters should be used in all situations as further discussed below, even with unimodal transmit beam main lobes and uniform δ-correlatted scatterer distributions where the $1^{st}$ eigenvector focuses onto the maximum of the unmodified transmit beam. Estimation errors in the limited data estimates of the correlation matrix R can introduce a remnant spatial linear component in the phase of said eigenvector.

Additional problems in the estimation of the correction filters can arise with a more heterogeneous distribution of scatterers, for example one or more additional, distinct and sufficiently strong scatterers in the vicinity of the transmit-beam mainlobe, possibly also embedded in a uniform distribution of δ-correlated scatterers. As the power of the received, corrected beam former signal is maximized by focusing the corrected receive beam onto the maximum of the product between the transmit beam profile and the scatterer strength, the $1^{st}$ eigenvector might focus the receive beam onto one of the distinct, strong scatterers or the center of a strong scatterer complex, instead of the peak of the transmit-beam mainlobe. The subsequent eigenvectors, ordered according to declining associated eigenvalues, will then focus the corrected receive beam onto local maxima of the product of the transmit beam amplitude and scatterer strength with correspondingly declining values. The associated eigenvalue is proportional to the power of the corrected receive beam former output signal with corrections given by said eigenvector. i.e. the $2^{nd}$ eigenvector focuses on the second strongest local maximum of the product, the $3^{rd}$ eigenvector focuses onto the $3^{rd}$ strongest maximum of the product, and so on.

When the additional scatterer or scatterer complex is sufficiently far from the transmit beam, the back-scattered signal from it is so weak that it will not influence the estimation of the correction filter. The problem arises when a strong scatterer or scatterer complex gets sufficiently close to the transmit beam main lobe to provide a strong back-scattered signal. We shall in the following describe how to obtain the correction filters in such a situation.

Figure 7:
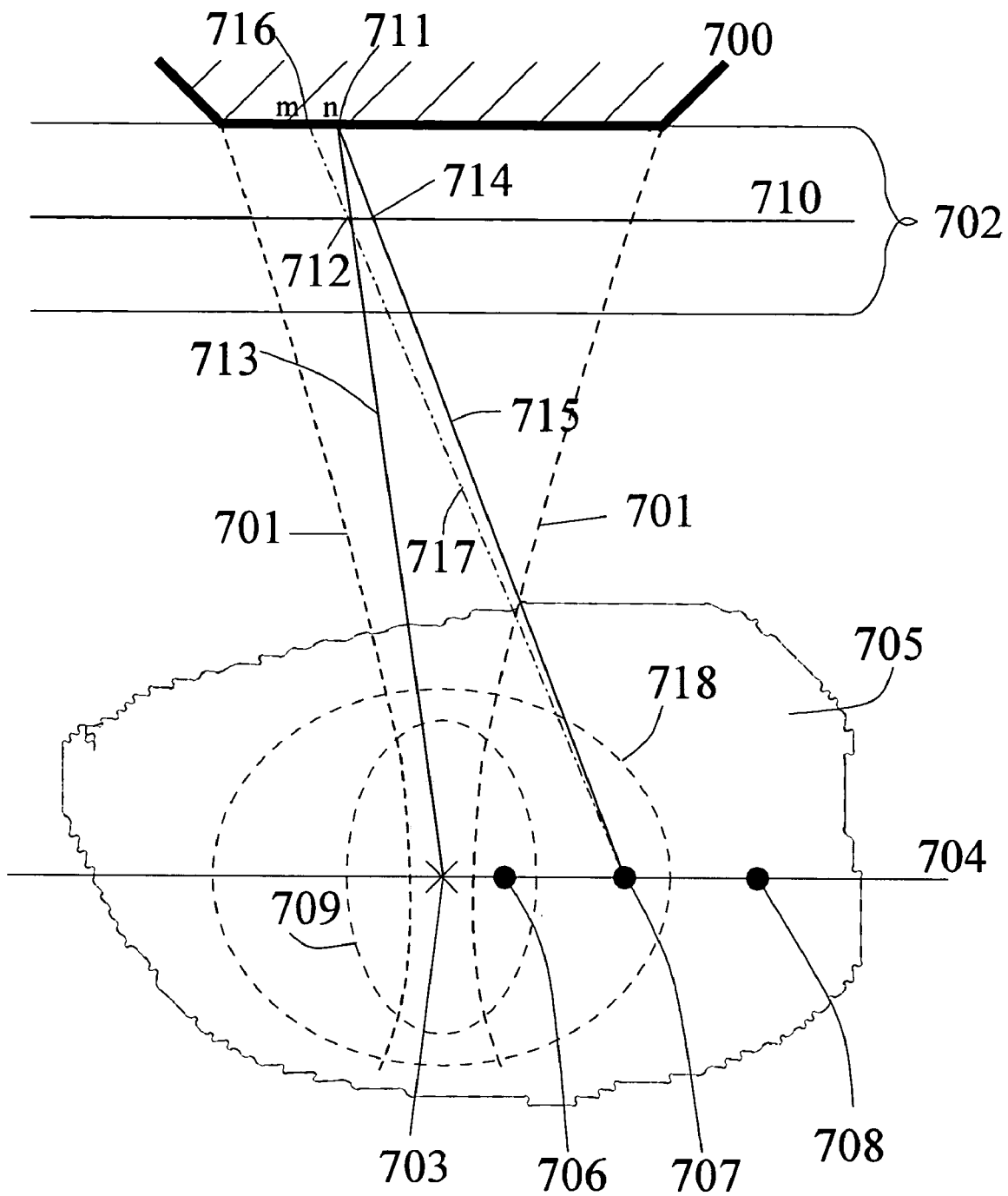
FIG. 7 shows a typical situation of wave propagation in a heterogeneous tissue with heterogeneous scatterer distribution and serves as an illustration to how to estimate correction filters in such situations.

To better understand this situation, we refer to FIG. 7 where 700 shows the ultrasound array with an indication 701 of the transmitted beam through the body wall 702. The transmit beam is subject to the refraction given by the spatial linear component of $\hat{S}$. FIG. 7 depicts a situation where this defraction is negligible. This helps keeping the Figure simple without loss of generality because this refraction is unobservable unless one have a point scatterer with known location, as described above. The transmit focus is set to a location $r_f$ indicated by the cross-point 703 on the lateral axis 704. The focal region is surrounded by a uniform δ-correlated scatterer distribution 705, and for the sake of the discussion we have placed additional, strong scatterers at three locations 706, 707, and 708 with increasing distance from the transmit beam axis.

The isoplanatic patch is the region where the generalized screen $\hat{S}$ can be approximated as independent of the scatterer location. The outer boundary of the isoplanatic patch around the transmit focus is indicated as 709 in the Figure. If the additional strong scatterer that defines the $1^{st}$ eigenvector, is inside the isoplanatic patch as with the location 706, said $1^{st}$ eigenvector will then differ from the optimal filter for focusing the beam onto the unmodified beam axis by a spatial linear component in the phase determined by the distance between the unmodified beam focus and the location of the scatterer as described in FIG. 8 and Eqs.(13-15). In this case one gets the best correction filters from said $1^{st}$ eigenvector with said spatial linear component of the phase removed.

In an intermediate location of the scatterer that defines the $1^{st}$ eigenvector, outside the isoplanatic patch indicated as the location 707, one will improve the filter estimate by shifting the $1^{st}$ eigenvector components side ways in addition to removing said spatial linear/plane component in the phase of the eigenvector. More details of this side ways shift is explained below. When the scatterer that defines the $1^{st}$ eigenvector has an even larger distance to the transmit beam axis, indicated by the scatterer 708, a better correction filter is obtained by using the eigenvector with a lower associated eigenvector with a smaller spatially linear component in the phase indicating a closer location to the transmit beam axis. The intermediate scatter location where one can benefit from an additional side shift of the correction filters is referred to as the quasiplanatic patch, limited by an outer boundary indicated by 718. The isoplanatic patch can hence be seen as a central region of the quasiplanatic patch where the side shift of the eigenvector is so small that it do not introduce better correction filters.

According to experiments, the aberrating effect of the body wall 702 can be approximated by a thin aberrating screen in the middle of the body wall, indicated as 710. The correction filter for element n, shown as 711, should then be obtained as the complex conjugate (See Eq.(4)) of the value of this thin screen at the intersection 712 between the thin screen 710 and the vectorial direction 713 between the element n and the intended focus 703. Now, in the geometric ray approximation, the received signal at element n from the scatterer 707 crosses the screen 710 at the intersection 714 between the screen and the vectorial direction 715 between the scatterer 707 and element n. Hence, the $1^{st}$ eigenvector component for element n is much stronger influenced by the thin screen value at 714 than at 712.

However, the $1^{st}$ eigenvector component at element m, whose location is determined by the intersection 716 between the array surface and the linear vector 717 from the scatterer 707 through the point 712 on the thin screen, will be highly influenced by the thin screen value at 712. Hence, a better estimate of the correction filter for element n is then obtained by removing the spatial linear component in the phase of the $1^{st}$ eigenvector, and side-shifting said $1^{st}$ eigenvector so that component m of the modified $1^{st}$ eigenvector is used for the correction filter for the signal at element n. Calculation of the location m for each array element n can be done by any-one skilled in the art through geometric considerations as described above.

The angular distance between the transmit beam axis and the dominating scatterer complex for the selected eigenvector, is obtained from the spatial linear component of the phase of said eigenvector. The linear distance of said scatterer complex to the transmit beam axis is hence given by the product of said linear component and said scatterer depth. Hence, for a scatterer complex to be inside the isoplanatic patch, the magnitude of the spatial linear component of the phase of the corresponding eigenvector must be less than an isoplanatic limit. For a scatterer complex to be inside the quasiplanatic patch, the magnitude of the spatial linear component of the phase of the components of the corresponding eigenvector must be less than a quasiplanatic limit. With reference to FIG. 7 we see that the isoplanatic and quasiplanatic limits depends on how fast the value of the thin screen varies along the screen (i.e. the correlation length of the thin screen) in relation to its depth.

The side shift will produce missing estimates of the correction filters at the edges of the array. However, the area of these edge regions is generally small and has low effect on the total beam, so that the missing estimates can for example be remedied by one or more of the following steps: 1) The amplitude of the correction filters are slowly set to zero at the edges of the array by some apodization, or 2) One can substitute the missing values of the correction filters at the edges by the correction filters of the nearest neighbors, when the spatial variation of the correction filters between the elements is low, or 3) The missing values may be filled in by statistical prediction, which is well described in the literature.

The model of a thin screen as described above, and the assumption of geometric ray propagation of the information, is an approximation that is adequate when the distance of the additional scatterer from the transmit beam axis is limited, and breaks down when the scatterer is further away from the transmit beam axis, exemplified by the scatterer in location 708. The region where the assumptions are acceptable then defines the quasiplanatic patch as described above. When the spatial linear component of the phase of the eigenvector is above the quasiplanatic limit, which for example can be set from experiments, one should also calculate, more eigenvectors, say $2^{nd}$ or $3^{rd}$ eigenvectors to find an eigenvector with spatial component of the phase less than the quasiplanatic limits or the isoplanatic limits.

If we have only one strong scatterer or scatterer complex in addition to the uniform $\delta$-correlated scatterer distribution, and the scattered signal from the additional scatterer is so strong that the $1^{st}$ eigenvector focuses the corrected receive beam onto this scatterer, then the $2^{nd}$ eigenvector will focus the corrected receive beam onto the maximum of the transmit beam. However, if there are more than one additional, strong and distinctive scatterer or scatterer complex close enough to the transmit beam to provide a back scattered signal of adequate strength, the $2^{nd}$ eigenvector might focus the corrected receive beam onto a scatterer or scatterer complex that produces a larger linear component in the phase of the $2^{nd}$ eigenvector than that of the $1^{st}$ eigenvector, indicating that the $2^{nd}$ scatterer is even further away from the transmit beam axis than the $1^{st}$ scatterer.

Hence, how many eigenvectors should be calculated to select the final correction filter, and if one is possibly going to use side shifting of the eigenvector in addition to removing the linear component of the eigenvector, depends on how efficient implementations of the calculation of the eigenvectors, the calculation of the linear component of the phase of the eigenvectors, and the side shifting of the eigenvectors we have available.

The general form of the procedure can then be written in short:

1. The $1^{st}$ eigenvector of the cross correlation matrix R of the element signals is calculated.

2. The spatially linear component of the phase of the $1^{st}$ eigenvector is extracted and compared to the isoplanatic or quasiplanatic limits to decide if it represents scatterers in the isoplanatic or the quasi planatic patches.

3. In case the outcome of Point 2) is that the $1^{st}$ eigenvector represents scatterers within the isoplanatic patch, said spatially linear component is removed from it's phase, and the modified $1^{st}$ eigenvector is used for correction filters.

4. In case the outcome of Point 2 is that the $1^{st}$ eigenvector represents scatterers within the quasiplanatic patch, the linear component is removed from it's phase, and the modified $1^{st}$ eigenvector is side shifted according to the procedure described above before it is used for correction filters.

5. In case the outcome of Point 2 is that the $1^{st}$ eigenvector represents scatterers outside the quasiplanatic patch, one calculates $2^{nd}$ and possibly lower order eigenvectors, extract the spatially linear component of the phase to decide if the eigenvector is inside the iso- or quasi planatic patches, until one finds an eigenvector that is inside the isoplanatic patch and return to 3) and finish, or inside the quasiplanatic patch and return to 4) and finish.

Whether one shall bother with eigenvectors from scatterers in the quasiplanatic patch depends on the efficiency of the implementation of calculating the eigenvectors. If the calculation of the eigenvectors is efficient, one can jump point 4 above and calculate a new eigenvector if the previous eigenvector stems from scatterers outside the isoplanatic patch.

The eigenvectors of Eq.(12) may be assigned a free normalization, which introduces a gain factor in the correction filter. Optimizing $J(\omega)$ in Eq.(11) independently for each $\omega$ requires a relation between the normalizations for each $\omega$ as for example done in Eqs.(17,18,19) below.

With strong wavefront aberration in the tissue, or strong off-axis scatterers, one generally gets improved estimation of the correction filters by iterative corrections of the transmit beam:

1. One or more pulses is transmitted towards the actual region with transmit beams corrected with a priori correction filters. The a priori correction filter is either a unit filter (i.e. no correction), or a filter obtained from neighboring beams, for example by side shifting, or a posteriori estimated correction filters obtained as below.

2. New a posteriori correction filters are estimated from the back scattered element signals from these transmitted pulses according to the scheme described in the previous paragraphs.

3. Based on set criteria, for example number of iterations, decision is made on finalizing the iteration or continue to point 4.

4. The a posteriori correction filters from point 2 are used as new a priori correction filters for the transmit beam and one moves to point 1.

When a better a priori estimate for the aberration correction filter than the non-correcting filter with unit amplitude and zero phase, is available, this should be applied when performing the initial transmit of the transmit-iteration correction. Such an a priori estimate can be obtained from the correction filters for one or more neighboring beams during image formation. An a priori estimate can for example be obtained as a combination of the correction filters from neighboring beams according to well known prediction methods, the methods possibly involving side ways shifting of the correction filters from neighboring beams according to the depth of a thin screen approximating the aberrations, and the differences in propagation paths of the beams involved in accordance with the discussion in relation to the side shifting of the correction filters in relation to FIG. 7. A simple a priori estimate can for example be obtained by side shifting the correction filters for the nearest neighbor beam. Such a shift will possibly imply that an a priori estimate for some of the correction filters is not available along the edges, but the missing estimates can for example be remedied by the same steps as described in relation to FIG. 7.

Hence, in one aspect of the invention, the aberration correction filters are selected among the eigenvector of Eq.(12) associated with a sufficiently large eigenvalue, that has the smallest spatially linear/plane phase component. Several methods of estimating the Eigenvector may be used under this general principle, where, by way of example, an iterative scheme is presented as here.

An a priori guess for the correction filter, $\underline{H}_0$, is formed. This may typically represent no correction, represented as a unity filter on each channel $$\underline{H}_0 = (1,1,1,\ldots,1) \text{ where } \|\underline{H}_0\|_2^2 = \Sigma_n |H_{0,n}|^2 = N. \quad (16)$$

Here $\|\cdot\|_2$ denotes the $L^2$ norm. The eigenvector with the highest eigenvalue is then obtained through the following iteration scheme.

$$\hat{\underline{H}}_{q+1}^1 = R\underline{H}_q^1 \quad (17)$$

$$\underline{H}_{q+1}^1(\omega) = \frac{N}{\|\hat{\underline{H}}_{q+1}^1(\omega)\|_2} H_U(\omega)\hat{\underline{H}}_{q+1}^1(\omega) \quad \|\hat{\underline{H}}_{q+1}^1(\omega)\|_2^2 = \sum_n |\hat{H}_{n,q+1}^1(\omega)|^2 \quad (18)$$

The upper index 1 indicates the largest eigenvalue, and q labels the iteration step. At each iteration, a normalization is performed, where we $H_U(\omega)$ is used to ensure that the correction filters get adequate functional dependence on $\omega$. A useful form of $H_U(\omega)$ is $$H_U(\omega) = \frac{1}{U(\omega)} \frac{1}{1 + 1/SN\,|U(\omega)|^2}, \quad (19)$$

where $U(\omega)$ is the Fourier transform of the received unit amplitude pulse from a point scatterer in a homogeneous medium, and the parameter SN is the signal-to-noise ratio. Equation (19), therefore, represents a Wiener type inversion filter of the received pulse. Other choices of $H_U(\omega)$ are possible, for example the matched filter form $H_U(\omega) = U^*(\omega)$, or $H_U(\omega) = e^{-i\phi(\omega)}/(1+1\text{SN}|U\omega)|^2)$, where $\phi(\omega)$ is the phase of $U(\omega)$.

Iteration of Eqs.(17,18) until adequate convergence results in $\underline{H}^1(\omega)$. As the correction filters are estimated independently for each frequency, estimation errors in $R_{mn}(\omega)$ in Eq.(11) will introduce noise in the filters as a function of $\omega$. Similar to frequency smoothing in the estimate of $R_{mn}(\omega)$, as pointed out after Eq.(11), it may be desirable to smoothen the final result $\underline{H}^1(\omega)$ along the frequency coordinate.

The second eigenvector $\underline{H}^2(\omega)$ is orthogonal to $\underline{H}^1(\omega)$. This is utilized in the following iterative scheme to find $\underline{H}^2$.

$$\hat{\underline{H}}_{q+1}^2 = R\underline{H}_q^2 \quad (20)$$

$$\hat{\underline{H}}_{q+1}^2 = \hat{\underline{H}}_{q+1}^2 - \frac{(\underline{H}^1, \hat{\underline{H}}_{q+1}^2)}{(\underline{H}^1, \underline{H}^1)} \underline{H}^1 \quad (\underline{H}^1, \hat{\underline{H}}_{q+1}^2) = \sum_n H_n^{1*} \hat{H}_{n,q+1}^2 \quad \underline{H}_{q+1}^2(\omega) = \frac{N}{\|\hat{\underline{H}}_{q+1}^2(\omega)\|_2} H_U(\omega)\hat{\underline{H}}_{q+1}^2(\omega) \quad (21)$$

To ensure that the iterated eigenvectors are orthogonal to the first eigenvector, the projection of the result onto the first eigenvector is subtracted in Eq.(21). Upon convergence, this scheme yields the eigenvector $\underline{H}^2(\omega)$.

According to the general principle of the invention, the eigenvector with the smallest linear/plane phase component is used as an aberration correction filter. In special situations, there may be an advantage in considering the eigenvector with third largest eigenvalue. This eigenvector can be obtained with an iteration scheme similar to the one above, where orthogonalization both to $\underline{H}^1$ and $\underline{H}^2$ is performed by substracting the projections onto $\underline{H}^1$ and $\underline{H}^2$. This procedure may be expanded to sequentially find the eigenvector for any of the eigenvalues in a decreasing order, where orthogonality is maintained by subtracting the projections onto all previously established eigenvectors at each iteration step.

The eigenvalue problem of Eq.(12), can be written as a correlation with the received, corrected beam former signal. The component form of Eq.(12) can be written as $$\lambda H_p = \sum_n R_{pn} H_n = \sum_n \frac{1}{K} \sum_k \frac{w_p w_n}{T_k} Y_{pk}^* Y_{nk} H_n \quad (22)$$

which can be further developed as $$\lambda H_p = \frac{w_p}{K} \sum_k \frac{1}{T_k} Y_{pk}^* B_k^c \quad (23)$$

where $B_k^c$ is the corrected, weighted receive beam former signal as defined in Eq.(9). The iterative scheme for the first eigenvector in Eqs.(16-18) can then be written as an iterative correlation with the corrected beam former output signal as follows:

$$\hat{H}_{p,q+1}^1 = \frac{w_p}{K} \sum_k \frac{1}{T_k} Y_{pk}^* B_{k,q}^{1c} \quad B_{k,q}^{1c} = \sum_n w_n H_{n,q}^1 Y_{nk}. \quad (24)$$

The normalization of eigenvectors is then performed as in Eq.(18). The same scheme may also be used for the eigenvectors for the second and third largest eigenvalues where Eq.(20) is substituted for a correlation with the corrected beam former signal in a similar manner, e.g., $$\hat{H}_{p,q+1}^2 = \frac{w_p}{K} \sum_k \frac{1}{T_k} Y_{pk}^* B_{k,q}^{2c} \quad B_{k,q}^{2c} = \sum_n w_n H_{n,q}^2 Y_{nk} \quad (25)$$

for the second largest eigenvalue with the orthogonalization and normalization as in Eq.(21). The amplitude $A_n(\omega)$ and phase $\phi_n(\omega)$ of the correction filters for each component n are defined as $$H_n(\omega) = A_n(\omega) e^{i\theta_n(\omega)}. \quad (26)$$

Since the eigenvalues of R are real, Eq.(12) can be split into a phase equation and an amplitude equation as follows $$\theta_p = \angle \left\{ \sum_n w_p w_n R_{pn} A_n e^{i\theta_n} \right\} \quad (27)$$

$$= \angle \left\{ \frac{w_p}{K} \sum_k \frac{1}{T_k} Y_{pk}^* \sum_n w_n A_n e^{i\theta_n} Y_{nk} \right\}$$

$$= \angle \left\{ \frac{w_p}{K} \sum_k \frac{1}{T_k} Y_{pk}^* B_k^c \right\}$$

-continued $$A_p = \frac{w_p}{\lambda K} \sum_k \frac{1}{T_k} (Y_{pk} e^{i\theta_p})^* \sum_n w_n A_n e^{i\theta_n} Y_{nk}$$

$$= \frac{w_p}{\lambda K} \sum_k \frac{1}{T_k} (Y_{pk} e^{i\theta_p})^* B_k^c.$$

Here $<\{\cdot\}$ denotes the phase of the complex number. An iteration scheme based on these equations for the first eigenvector, analogous to Eqs.(17,18), will then be $$\theta_{p,q+1}^1 = \angle\left\{\sum_k \frac{1}{T_k} Y_{pk}^* B_{k,q}^{1c}\right\} \quad (28)$$

$$B_{k,q}^{1c} = \sum_n w_n A_{n,q}^1 e^{i\theta_{n,q}^1} Y_{nk}$$

$$\hat{A}_{p,q+1}^1 = \frac{w_p}{K} \sum_k \frac{1}{T_k} \left(Y_{pk} e^{i\theta_{p,q+1}^1}\right)^* B_{k,i}^{1cc}$$

$$B_{k,q}^{1cc} = \sum_n w_n A_{n,q}^1 e^{i\theta_{n,q+1}^1} Y_{nk}$$

$$A_{p,q+1}^1(\omega) = \frac{N}{\sqrt{\sum_n \left|\hat{A}_{n,q+1}^1(\omega)\right|^2}} |H_U(\omega)| \hat{A}_{p,q+1}^1(\omega)$$

Here N is the total number of element signals for aberration correction. Normalizing the filter gain in the last equation again ensures that the correction filter has a reasonable functional dependence on ω. It is then convenient to start the iteration with $\theta_{p,0}=0$ and $A_{p,0}=1$, as in Eq.(16), which is the optimal solution without aberration.

The same scheme may be expanded for the second and third eigenvectors, adding the requisite orthonormalization schemes.

Figure 6:
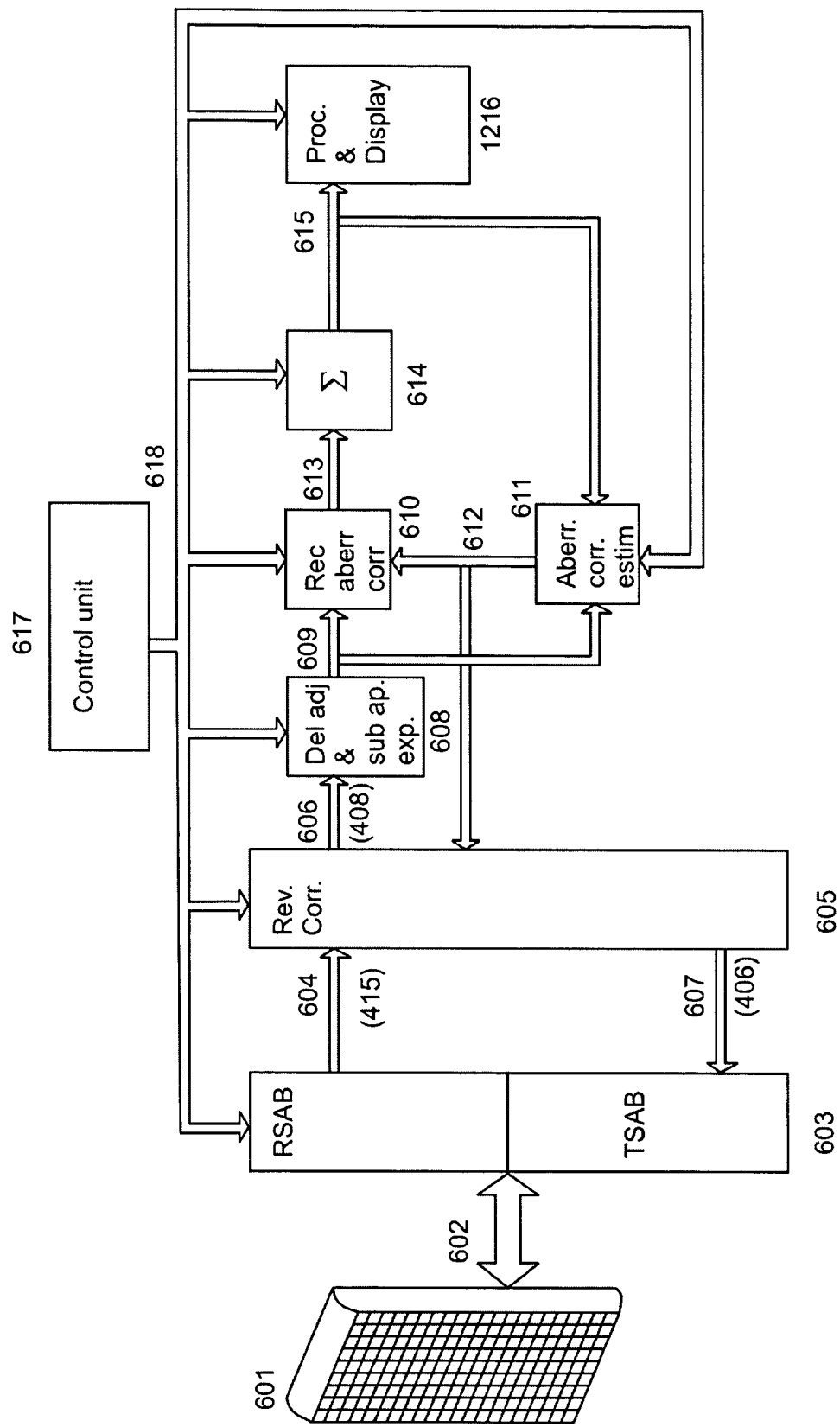
FIG. 6 shows a block diagram of a processing system for correcting pulse reverberations and wavefront aberration in an ultrasound imaging system.

The filter corrections can be carried through in FIR filters, where FIG. 5a shows an example of a receive filter unit with the impulse response $h(\underline{r},\underline{r}_f; \tau)$ as the inverse Fourier transform of $H(\underline{r},\underline{r}_f; \omega)$, implemented in the block 501 (610 of FIG. 6). The filter unit takes as its input the reverberation corrected receiver signals given as 502 (609 of FIG. 6), and produces receive element (or sub-aperture element) signals (503) (613 of FIG. 6) that are corrected for the wavefront aberrations of the heterogeneous variation of the propagation velocity. The filter impulse response (filter coefficients) is set via the connection (612) of FIG. 6 that is presented by a wavefront aberration correction estimation unit (611) described below.

The transmitted pulse with corrections for wavefront aberrations, can for each element be generated by a filter with the impulse response $h_{abc}(\underline{r},\underline{r}_f; \tau)$, as illustrated in FIG. 5b. This unit contains an implementation of the correction filter in the block 506, for example as a FIR filter. The filter takes as its input a base pulse (505) that would be used for homomgeneous beam forming in the assumption of constant propagation velocity in the tissue. The output (406) of the digital filter is then fed to transmit D/A converter (407) shown both in FIG. 4 and FIG. 5b, to produce the analog signal (408). Alternatively, the output of filter 506 could be stored in a memory device, and replayed for each pulse transmit by a trigger signal. In this situation the filtering of the pulse in 506 with $h_{abc}(\underline{r},\underline{r}_f; \tau)$ can also be done in a SW-programmed processor and the result stored in the memory device. The pure delay part of the transmit correction can be implemented as a delayed read-out of the memory.

In a delay and amplitude approximation of the correction, the delay correction may implemented as the trigger point of the transmit pulse generator 505 with an added amplitude gain for the amplitude correction. The details of such designs and methods are obvious to one skilled in the art. For the receive correction, the filter 501 would in the approximation of delay and amplitude correction, be implemented using a delay line and a variable gain.

The delay and amplitude approximations of Eq.(6) can for example be found from the solutions in the temporal Fourier domain given above, as $$\tau_n = \frac{1}{\omega_0} \angle\{H_n(\omega_0)\} \quad a_n = |H_n(\omega_0)| \quad (29)$$

where $\omega_0$ is the center frequency of the band. One could also calculate $\tau_n$ through a linear approximation of the phase of $H_n$ over a defined frequency band, and similarly the approximate amplitude as the average of $|H_n|$ in this band.

The methods of estimation of the aberration corrections in Eqs.(7-28) are for simplicity described in the temporal Fourier domain. It is clear, however, that by inverse Fourier transform equivalent operations in the temporal domain are obtained.

The temporal form of Eq.(9) is $$b_k^c(t) = \sum_n w_n h_n \underset{t}{\otimes} y_{nk} \approx \sum_n w_n a_n y_{nk}(t + \tau_n) \quad (30)$$

where $h_n(t)$ is the temporal impulse response of the correction filter with frequency response $H_n(\omega)$. The mid term denotes temporal convolution between $h_n(t)$ and $y_{nk}(t)$, and the last term gives the result with the delay and amplitude approximation of the filter. To find the full impulse response $h_n(t)$, it is convenient to perform the calculations in the Fourier domain as in Eqs.(7-28), while the approximate amplitude and/or delay corrections can conveniently be calculated in the temporal domain.

As in Eq.(10) an energy functional of the corrected receive beam former output is defines as $$J = \frac{1}{K} \sum_k \frac{1}{T_k} \int_{T_k} dt |b_k^c(t)|^2 - \lambda \sum_n a_n^2 \quad (31)$$

$$= \frac{1}{K} \sum_k \frac{1}{T_k} \int_{T_k} dt \left|\sum_n w_n a_n y_{nk}(t + \tau_n)\right|^2 - \lambda \sum_n a_n^2$$

where $T_k$ is the length of the received signal, that is used for the estimation, along the temporal coordinate axis. This expression is further developed to $$J = \sum_{mn} a_m R_{mn}(\tau_n - \tau_m) a_n - \lambda \sum_n a_n^2 \quad (32)$$

$$R_{mn}(\tau_n - \tau_m) = \frac{w_m w_n}{K} \sum_k \frac{1}{T_k} \int_{T_k} dt\, y_{mk}(t+\tau_m) y_{nk}(t+\tau_n)$$

The function $y_{nk}(t)$ is the received RF-signal on element (sub-aperture) n where k denotes the pulse number and/or region as above. Furthermore, $R_{mn}(\tau_n-\tau_m)$ is the correlation matrix for the homogeneously corrected element signals, where the aberration-correction time-delays have also been applied. From its definition the matrix is symmetric. Hence, the eigenvectors form an orthogonal basis for the real N-dimensional space.

Equating the derivative of J with respect to $a_p$ to zero yields $$\lambda a_p = \Sigma_n R_{pn}(\tau_n - \tau_p) a_n \qquad (33)$$

which produces the amplitudes as eigenvectors of the correlation matrix of the RF element signals with the lag $\tau_n - \tau_p$. Introducing the expression for the correlation matrix in Eq.(32) allows rearrangement of Eq.(33) to $$\lambda a_p = \frac{w_p}{K} \sum_k \frac{1}{T_k} \int_{T_k} dt\, y_{pk}(t+\tau_p) b_k^c(t) \qquad (34)$$

i.e., the correction amplitude is found through correlation between the delay-corrected RF element signals and the corrected receive beam former output RF signal.

Equating the derivative of J in Eq.(32) with respect to $\tau_p$ to zero, gives $$\sum_n a_n \frac{\partial R_{np}(\tau_p - \tau_n)}{\partial \tau_p} = -\sum_n a_n \frac{\partial R_{np}(\tau_p - \tau_n)}{\partial \tau_n} = 0 \qquad (35)$$

where the last expression is obtained as $-\tau_n$ enters in the argument of $R_{np}$ in the same way as $\tau_p$. This expression is complex to use to determine the delay corrections, because an an analytical form of $R_{np}$ is not available. Introducing the expression for the correlation matrix in Eq.(34), and noting that $\partial y_{pk}(t+\tau_n)/\partial \tau_n = \partial y_{pk}(t+\tau_n)/\partial t$, we can rearrange Eq.(35) to $$\sum_k \frac{1}{T_k} \int_{T_k} dt\, \frac{\partial y_{pk}(t+\tau_p)}{\partial t} b_k^c(t) = \qquad (36)$$

$$-\sum_k \frac{1}{T_k} \int_{T_k} dt\, y_{pk}(t+\tau_p) \frac{\partial b_k^c(t)}{\partial t} = 0$$

This equation together with Eq.(34) can be solved through an iteration scheme as $$\tau_{p,q+1} = \tau_{p,q} + \mu \sum_k \frac{1}{T_k} \int_{T_k} dt\, y_{pk}(t+\tau_{p,q}) \frac{\partial b_{k,q}^c(t)}{\partial t} \qquad (37)$$

$$b_{k,q}^c(t) = \sum_n w_n a_{n,q} y_{nk}(t+\tau_{n,q})$$

$$\tilde{a}_{p,q+1} = \frac{w_p}{K} \sum_k \frac{1}{T_k} \int_{T_k} dt\, y_{pk}(t+\tau_{p,q}) b_{k,q}^c(t)$$

$$a_{p,q+1} = \frac{N}{\sqrt{\sum_n |\tilde{a}_{n,q+1}|^2}} \tilde{a}_{p,q+1}$$

where the iteration step is denoted by q, as above. The expression with $\partial b_k^c/\partial t$ from Eq.(36) has been used as one then differentiates only one signal; the corrected receive beam former output signal. Here $\mu$ is a constant that can be selected for best convergence of the iteration procedure. Several methods to perform this are given in the literature of numerics.

The estimation in the temporal domain can be further developed by introducing the analytic extension of the homogeneously corrected element signals as $$\hat{y}_{nk}(t) = y_{nk}(t) + iH\{y_{nk}(t)\} = \tilde{y}_{nk}(t) e^{i\omega_0 t} \qquad (38)$$

where $H\{\}$ is the Hilbert transform, and $\bar{\omega}_0$ is the center frequency of the RF-band. The function $y_{nk}(t)$ is the complex envelope of the receive signal where the real and imaginary parts are the in-phase and the quadrature components of the signal that can be retrieved through quadrature demodulation of the received RF signal according to methods known to any-one skilled in the art.

The complex envelope is a low-pass signal so that the following approximations are adequate $$\frac{\partial \hat{y}_{nk}(t)}{\partial t} \approx i\omega_0 \hat{y}_{nk}(t) \quad \hat{y}_{nk}(t+\tau_n) \approx e^{i\omega_0 \tau_n} \hat{y}_{nk}(t) \qquad (39)$$

With the complex RF-signal, Eqs.(30,32) take the form $$\hat{b}_k^c(t) \approx \sum_n w_n a_n \hat{y}_{nk}(t+\tau_n) \qquad (40)$$

and $$J = \sum_{mn} a_m \hat{R}_{mn}(\tau_n - \tau_m) a_n - \lambda \sum_n a_n^2$$

$$\hat{R}_{mn}(\tau_n - \tau_m) = \frac{w_m w_n}{K} \sum_k \frac{1}{T_k} \int_{T_k} dt\, \hat{y}_{mk}^*(t+\tau_m) \hat{y}_{nk}(t+\tau_n) \qquad (41)$$

Equating the derivative of J with respect to $a_p$ to zero, gives $$\lambda a_p = \Sigma_n Re\{\hat{R}_{pn}(\tau_n - \tau_p)\} a_n \qquad (42)$$

Inserting the expression for the correlation matrix in Eq.(41), gives $$\lambda a_p = \frac{w_p}{K} \sum_k \frac{1}{T_k} \int_{T_k} dt\, Re\{\hat{y}_{pk}^*(t+\tau_p) \hat{b}_k^c(t)\} \qquad (43)$$

$$= \frac{w_p}{K} Re\left\{\sum_k \frac{1}{T_k} \int_{T_k} dt\, \hat{y}_{pk}^*(t+\tau_p) \hat{b}_k^c(t)\right\}$$

Equating the derivative of J in Eq.(41) with respect to $\tau_p$ to zero, gives $$\sum_n a_n w_n \mathrm{Re}\left\{\frac{\partial \hat{R}_{pn}(\tau_n - \tau_p)}{\partial \tau_p}\right\} = -\sum_n a_n w_n \mathrm{Re}\left\{\frac{\partial \hat{R}_{pn}(\tau_n - \tau_p)}{\partial \tau_n}\right\} = 0 \quad (44)$$

Introducing the expression for the correlation matrix in Eq.(41), and noting that $\partial \hat{y}_{pk}(t+\tau_n)/\partial \tau_n = \partial \hat{y}_{pk}(t+\tau_n)/\partial t$, Eq. (44) is rearranged to $$\sum_k \frac{1}{T_k}\int_{T_k} dt\, \mathrm{Re}\left\{\frac{\partial \hat{y}_{pk}^*(t+\tau_p)}{\partial t}\hat{b}_k^c(t)\right\} = \quad (45)$$

$$-\sum_k \frac{1}{T_k}\mathrm{Re}\left\{\int_{T_k} dt\, \hat{y}_{pk}^*(t+\tau_p)\frac{\partial \hat{b}_k^c(t)}{\partial t}\right\} = 0.$$

As for the real signal, we can establish an iteration procedure to determine the amplitude and delay corrections as $$\tau_{p,q+1} = \tau_{p,q} + \mu\sum_k \frac{1}{T_k}\mathrm{Re}\left\{\int_{T_k} dt\, \hat{y}_{pk}^*(t+\tau_{p,q})\frac{\partial \hat{b}_{k,q}^c(t)}{\partial t}\right\} \quad (46)$$

$$\hat{b}_{k,q}^c(t) = \sum_n w_n a_{n,q}\hat{y}_{nk}(t+\tau_{n,q})$$

$$\hat{a}_{p,q+1} = \frac{w_p}{K}\sum_k \frac{1}{T_k}\int_{T_k} dt\, \mathrm{Re}\left\{\hat{y}_{pk}^*(t+\tau_{p,q})\hat{b}_{k,q}^c(t)\right\}$$

$$a_{p,q+1} = \frac{N}{\sqrt{\sum_n |\hat{a}_{n,q+1}|^2}}\hat{a}_{p,q+1}$$

Introducing the approximations of Eq.(39), gives $$\mathrm{Re}\left\{\sum_k \frac{1}{T_k}\int_{T_k} dt\, \frac{\partial \hat{y}_{pk}^*(t+\tau_p)}{\partial \tau_p}\hat{b}_k^c(t)\right\} \approx \mathrm{Im}\left\{\omega_0\sum_k \frac{1}{T_k}\int_{T_k} dt\, \hat{y}_{pk}^*(t+\tau_p)\hat{b}_k^c(t)\right\} \quad (47)$$

$$\approx \mathrm{Im}\left\{\omega_0 e^{-i\omega_0\tau_p}\sum_k \frac{1}{T_k}\int_{T_k} dt\, \hat{y}_{pk}^*(t)\hat{b}_k^c(t)\right\}$$

Equating the last expression to zero, allows us to calculate $\tau_p$ as $$\tau_p = \frac{1}{\omega_0}\angle\left\{\sum_k \frac{1}{T_k}\int_{T_k} dt\, \hat{y}_{pk}^*(t)\hat{b}_k^c(t)\right\} \quad (48)$$

which gives an equation for obtaining the amplitude and delay corrections through iterations as $$\tau_{p,q+1} = \frac{1}{\omega_0}\angle\left\{\sum_k \frac{1}{T_k}\int_{T_k} dt\, \hat{y}_{pk}^*(t)\hat{b}_{k,q}^c(t)\right\} \quad (49)$$

$$\hat{a}_{p,q+1} = \frac{w_p}{K}\sum_k \frac{1}{T_k}\int_{T_k} dt\, \mathrm{Re}\left\{\hat{y}_{pk}^*(t+\tau_{p,q})\hat{b}_{k,q}^c(t)\right\}$$

$$a_{p,q+1} = \frac{N}{\sqrt{\sum_n |\hat{a}_{n,q+1}|^2}}\hat{a}_{p,q+1}$$

where one typically could start the iteration with the with $a_0=1$ and $\tau_0=0$ or values obtained from neighboring beams with a side shift as described above in relation to FIG. 7.

Now, a central part of the invention is to find the eigenvector with the lowest spatial plane/linear component in the phase of the frequency response of the correction filter. The frequency response for the amplitude and delay approximations of the correction filter is $H_n(\omega) = a_n e^{i\omega\tau_n}$, so that the phase is proportional to the delay correction. In the temporal domain one should, therefore, find the amplitude/delay approximation for the eigenvector with the second largest eigenvalue through a combination of the schemes in Eqs. (17,18,20,21) and Eqs.(37,46,49). We first find the amplitude and delay corrections for the highest eigenvalue according to one of Eqs.(37,46,49) with the frequency response at $\omega_0$ of $$H_p^1 = a_p^1 e^{i\omega_0\tau_p^1}. \quad (50)$$

Hence, calculating the amplitudes and delays in the time domain as in Eqs.(37,46,49) can be seen as part of finding an eigenvector to R at a particular frequency, say $\omega_0$. Then, given estimates $a^2_{p,q}$ and $\tau^2_{p,q}$ of iteration step q for the second highest eigenvalue, we carry through a further iteration to get the filter response for the second largest eigenvalue as $$\hat{\tau}^2_{p,q+1} = \quad (51)$$

$$\frac{1}{\omega_0}\angle\left\{\sum_k \frac{1}{T_k}\int_{T_k} dt\, \hat{y}_{pk}^*(t)\hat{b}_{k,q}^{2c}(t)\right\} \quad \hat{b}_{k,q}^{2c}(t) = \sum_n w_n a^2_{n,q}\hat{y}_{nk}(t+\tau^2_{n,q})$$

-continued $$\hat{a}_{p,q+1}^2 = \frac{w_p}{K} \text{Re}\left\{\sum_k \frac{1}{T_k}\int_{T_k} dt \hat{y}_{pk}^*(t+\tau_p)\hat{b}_{k,q}^{2c}(t)\right\} \hat{H}_{p,q+1}^2 =$$

$$\hat{a}_{p,q+1}^2 e^{i\omega_0 \hat{\tau}_{p,q+1}^2}$$

$$\hat{H}_{q+1}^2 = \hat{H}_{q+1}^2 - \frac{(H^1, \hat{H}_{q+1}^2)}{(H^1, H^1)} H^1 \quad \left(H^1, \hat{H}_{q+1}^2\right) = \sum_n H_n^{1*} \hat{H}_{n,q+1}^2$$

$$a_{p,q+1}^2 = \frac{N}{\|\hat{H}_{q+1}^2\|_2} |\hat{H}_{p,q+1}^2| \qquad \tau_{p,q+1}^2 = \frac{1}{\omega_0} L\{H_{p,q+1}^2\}$$

One should note that the delay and amplitude estimations in this scheme can equally be substituted by the schemes in Eqs.(37,46). Based on this general idea, the scheme can be expanded to the eigenvector of the eigenvalue of any order. The planar component of the delay corrections can then be obtained through a modified form of Eq.(14) where $\theta^m(\underline{r})$ is substituted with $\tau^m(\underline{r})$, to select the delay and amplitude sets with the lowest spatial linear/plane component in the delay function.

Eqs.(42-49) are based on availability of the complex analytic RF element signals and further processing of these to the corrected receive beam former output signal. The calculations can be simplified through the following exercises, where it is noted that the phase in Eq.(48) can be calculated as $$\tau_p = \tag{52}$$

$$\frac{1}{\omega_0}\tan^{-1}\frac{\sum_k T_k^{-1}\int_{T_k} dt(\text{Re}\{\hat{y}_{pk}(t)\}\text{Im}\{\hat{b}_k^c(t)\} - \text{Im}\{\hat{y}_{pk}(t)\}\text{Re}\{\hat{b}_k^c(t)\})}{\sum_k T_k^{-1}\int_{T_k} dt(\text{Re}\{\hat{y}_{pk}(t)\}\text{Re}\{\hat{b}_k^c(t)\} + \text{Im}\{\hat{y}_{pk}(t)\}\text{Im}\{\hat{b}_k^c(t)\})}$$

The integration over $T_k$ and summation over k is an estimate of the following ensemble expectation values $$\frac{1}{K}\sum_k \frac{1}{T_k}\int_{T_k} dt A_k(t) \approx \langle A_k \rangle \tag{53}$$

where <•> denotes ensemble averaging, K is the number of k's, and $A_k(t)$ take the forms below.

$$A_k(t)=\text{Re}\{\hat{y}_{pk}(t)\}\text{Im}\{\hat{b}_k^c(t)\} \quad A_k(t)=\text{Im}\{\hat{y}_{pk}(t)\}\text{Re}\{\hat{b}_k^c(t)\}$$

$$A_k(t)=\text{Re}\{\hat{y}_{pk}(t)\}\text{Re}\{\hat{b}_k^c(t)\} \quad A_k(t)=\text{Im}\{\hat{y}_{pk}(t)\}\text{Im}\{\hat{b}_k^c(t)\} \tag{54}$$

The approximation in Eq.(53) turns to equality as $T_k$ and/or $K \to \infty$ where for finite K and $T_k$ one will have a random estimation error of the ensemble averages, which is the reason for the approximation. From signal processing textbooks it is found that $$<\text{Re}\{\hat{y}_{pk}(t)\}\text{Im}\{\hat{b}_k^c(t)\}> = -<\text{Im}\{\hat{y}_{pk}(t)\}\text{Re}\{\hat{b}_k^c(t)\}>$$

$$<\text{Re}\{\hat{y}_{pk}(t)\}\text{Re}\{\hat{b}_k^c(t)\}> = <\text{Im}\{\hat{y}_{pk}(t)\}\text{Im}\{\hat{b}_k^c(t)\}> \tag{55}$$

For finite K and $T_k$, the random estimation errors produce the following approximations $$\tau_p \approx \frac{1}{\omega_0}\tan^{-1}\frac{\sum_k T_k^{-1}\int_{T_k} dt\,\text{Re}\{\hat{y}_{pk}(t)\}\text{Im}\{\hat{b}_k^c(t)\}}{\sum_k T_k^{-1}\int_{T_k} dt\,\text{Re}\{\hat{y}_{pk}(t)\}\text{Re}\{\hat{b}_k^c(t)\}} \tag{56}$$

$$\approx -\frac{1}{\omega_0}\tan^{-1}\frac{\sum_k T_k^{-1}\int_{T_k} dt\,\text{Im}\{\hat{y}_{pk}(t)\}\text{Re}\{\hat{b}_k^c(t)\}}{\sum_k T_k^{-1}\int_{T_k} dt\,\text{Re}\{\hat{y}_{pk}(t)\}\text{Re}\{\hat{b}_k^c(t)\}}.$$

Furthermore $$\text{Re}\{\hat{y}_{pk}(t)\}=y_{pk}(t) \quad \text{Re}\{\hat{b}_k^c(t)\}=b_k^c(t) \tag{57}$$

$$\text{Im}\{\hat{y}_{pk}(t)\}=H\{y_{pk}(t)\}\approx y_{pk}(t-\pi/2\omega_0)$$
$$\text{Im}\{\hat{b}_k^c(t)\}=H\{b_k^c(t)\}\approx b_k^c(t-\pi/2\omega_0)$$

where the approximation of the Hilbert transform through delaying the signals $\pi/2\omega_0$ is adequate for narrow band signals centered at $\omega_0$. Combining Eq.(56,57) we get the simplified expressions $$\tau_p \approx \frac{1}{\omega_0}\tan^{-1}\frac{\sum_k T_k^{-1}\int_{T_k} dt\,y_{pk}(t)H\{b_k^c(t)\}}{\sum_k T_k^{-1}\int_{T_k} dt\,y_{pk}(t)b_k^c(t)} \tag{58}$$

$$\approx \frac{1}{\omega_0}\tan^{-1}\frac{\sum_k T_k^{-1}\int_{T_k} dt\,y_{pk}(t)b_k^c(t-\pi/2\omega_0)}{\sum_k T_k^{-1}\int_{T_k} dt\,y_{pk}(t)b_k^c(t)}$$

In this expression, the Hilbert transform or its delay approximation operates only on the corrected receive beam former output. Hence it only has to be performed on one signal, simplifying the operations. A similar expression could be developed from the last part of Eq.(56), but there the Hilbert transform or its delay approximation must be performed on all the element signals, which is computationally more expensive. Some reduction in estimator variance can be obtained by combining the first and last expression in Eq.(56) along the lines of Eq.(52).

It is also noted that the following relations $$<\text{Re}\{\hat{y}_{pk}(t)\}\text{Im}\{\hat{b}_k^c(t)\}> = <\text{Re}\{\tilde{y}_{pk}(t)\}$$
$$\text{Im}\{\hat{b}_k^c(t)\}> = -<\text{Im}\{\tilde{y}_{pk}(t)\}\text{Re}\{\hat{b}_k^c(t)\}>$$

$$<\text{Re}\{\hat{y}_{pk}(t)\}\text{Re}\{\hat{b}_k^c(t)\}> = <\text{Re}\{\tilde{y}_{pk}(t)\}$$
$$\text{Re}\{\hat{b}_k^c(t)\}> = <\text{Im}\{\tilde{y}_{pk}(t)\}\text{Im}\{\hat{b}_k^c(t)\}> \tag{59}$$

allow the above operations on the analytic signal to be substituted for operations on the complex envelope. The real and imaginary parts are found as the in phase and the quadrature components of standard quadrature demodulator output signals as described above.

The present invention therefore devices a scheme for improved ultrasound imaging where an example block diagram implementation is shown in FIG. 6. In this Figure, the two-dimensional array is schematically illustrated by the block 601. With sub-aperture reduction of the number of correction channels, the array is first connected via 602 to a receive (RSAB) and transmit (TSAB) sub-aperture generator unit (603), which for example operates according to the principles shown in FIG. 4. The output of this unit is a reduced number of sub-aperture receive signals 604 (416/415 of FIG. 4) that is fed to a reverberation correction unit (605). When sub-aperture generation is not used, the unit 603 is omitted and the element signals directly by-passed to the next unit.

The reverberation correction unit 605 produces an output 606 of reverberation corrected receive sub-aperture signals (or element signals), and also transmit signals 607. This may by way of example operate according to the methods described in U.S. Pat. No. 6,485,423 or U.S. patent application Ser. No. 10/408,538. One method of reducing pulse reverberations is to use the $2^{nd}$ harmonic components of the element signals which have reduced body-wall pulse reverberation noise compared to the $1^{st}$ harmonic components. The $2^{nd}$ harmonic components can be extracted by band pass filters in 605. A simpler implementation is obtained by correlating the received element signals with $2^{nd}$ harmonic components of the receive beam former output signal with the unfiltered element signals in the estimation unit 611 described below. This correlation selects the $2^{nd}$ harmonic components of the element signals with low body wall pulse reverberations, because different frequency components in the signals are uncorrelated. The suppression of pulse reverberations is then done directly in the estimation unit 611 and the reverberation correction unit 605 can be omitted. With limited pulse reverberation noise in the signal, the unit 605 may be bypassed or omitted.

The reverberation corrected receive sub-aperture signals 606 are fed to a unit 608 which delay adjusts the sub-aperture signals (or element signals) for direction and focus steering of the beam based on the assumption of constant propagation velocity in the tissue. The unit also can perform amplitude appodization of the sub-aperture signals, combined with the amplitude appodization in unit 603, according to standard methods of beam forming. When the correlation length of the wavefront aberrations is much longer than the dimension of the sub-apertures generated in the unit 603, one can optionally expand the dimension of the sub-apertures at the output of unit 608 by adding delay adjusted signals from neighboring sub-apertures, and hence reduce the number of signals for phase aberration estimation and correction. The dimension of these larger sub-apertures are still less than the correlation length of the phase-aberration disturbances along the array.

The output signals 609 of the unit 608 are then fed both to a receive correction unit 610 for the wavefront aberrations, and an estimation unit 611 of the aberration correction filters. This unit performs, according to the invention, calculations of the form exemplified in the above description. The output 612 of the estimation unit 611 is the correction filter characteristics, for example the impulse responses or approximate delay and amplitude corrections, to the receive aberration correction unit 610, and also to the unit 605 for corrections of the wavefront aberration in the transmit beam as discussed in relation to FIG. 5b. The receive phase aberration correction in unit 610 can conveniently be done by a FIR filter for each sub-aperture, as illustrated in FIG. 5a, or by approximate delay and amplitude corrections according to methods known by those skilled in the art, as discussed above.

The aberration corrected sub-aperture signals 613, are then added in the summation unit 614 to form the corrected receive beam former output signal 615. Optionally, the unit 614 can introduce sets of added delay adjustments of the sub-aperture signals before summation to produce parallel receive beam signals from several neighboring beam directions in parallel. In this case one would have to transmit a wide beam, and aberration correction of the transmit beam is less urgent. In some cases it will be an advantage to have separate set of correction filters for the different parallel receive beams, which implies that the receive beam parallelization must be done in the unit 608 with parallel receive correction units 610 for each beam with differences in the correction filters between the beams.

The beam signals 615 are then fed to the unit 616 for further processing of the signals to ultrasound images, and display of the images, according to known methods. The whole system is controlled by the unit 617, which transfers control signals to all units over the control bus 618.

Thus, while fundamental novel features of the invention has been pointed out as applied to a preferred embodiment thereof, it will be understood that various omissions and substitutions and changes in the form and details of the devices illustrated, and in their operation, may be made by those skilled in the art without departing from the spirit of the invention. For example, one can transmit wide or multiple transmit beams and operate several receive and aberration estimation and correction units in parallel for several beam directions, where the unit 608 performs delay adjustments for several receive beam directions in parallel, and directing the delay adjusted signals to their respective parallel receive estimation and correction units. One can also do the delay and delay adjustments of unit 608 and aberration estimation and corrections of units 611 and 610 in a hierarchical manner where neighboring sub-apertures are delay adjusted and corrected and summed into a higher level sub-aperture signal where neighbors of the new sub-apertures in a next level are delay adjusted and corrected and summed into a higher level sub-apertures, and so on until all the original sub-apertures have been combined to one beam signal or several parallel beam signals.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for corrections of wavefront aberrations in a received signal for ultrasound imaging in tissue, using an ultrasound transducer array with a two-dimensional distribution of elements, the elements having a surface dimension that is shorter than a correlation length of the wave front aberrations of the received signal across said array surface, comprising the steps of:

connecting the elements to a transmit and a receive beam former where homogeneous delay and amplitude corrections of signals from the elements for direction steering and focusing of the transmit and receive beams are done based on an assumption of a constant propagation velocity in the tissue;

filtering the element signals, when in receive mode, in receive aberration correction filters before being added to the final, corrected receive beam former output signal; filtering the element signals; when in transmit mode, in transmit correction filters to form aberration corrected element pulses that are transmitted; and estimating correction filter characteristics for each element for at least one frequency from corresponding components of at least one eigenvector of a correlation matrix of the received element signals at said frequency.

2. A method for corrections of wavefront aberrations according to claim 1, wherein the ultrasound transmit and receive waves traverse a region of aberrating tissue that defines an isoplanatic limit, wherein an order value of an eigenvector is given, and wherein the correction filter characteristics for at least one frequency of said element signals are estimated with the following steps:

a) the $1^{st}$ eigenvector (with the largest eigenvalue) of the correlation matrix of the received element signals at said frequency is calculated to form a first selected eigenvector for derivation of the correction filter characteristics, b) the spatial linear component of the phase of said selected eigenvector at said frequency is extracted and when the magnitude of said linear component is less than said isoplanatic limit, or the order of said selected eigenvector is larger than said order limit, said linear component is removed from said phase to produce a modified eigenvector, and the procedure moves to step d), c) the next order eigenvector, ordered according to decreasing eigenvalues, of the correlation matrix of the element signals at said frequency is calculated and selected as the next eigenvector for derivation of the correction filter characteristics, and the procedure moves to the top of step b), d) wherein the components of said modified eigenvector are used as a basis for the element signal correction filter characteristics for the transmit and/or the receive beams.

3. A method for corrections of wavefront aberrations according to claim 1, wherein the ultrasound transmit and receive waves traverse a region of aberrating tissue that defines an isoplanatic limit and a quasiplanatic limit and an approximative thin aberration screen at a defined depth in tissue, wherein an order value of an eigenvector is given, and wherein the correction filter characteristics for at least one frequency of said element signals are estimated with the following steps:

a) the $1^{st}$ eigenvector (with the largest eigenvalue) of the correlation matrix of the received element signals at said frequency is calculated to form a first selected eigenvector for derivation of the correction filters at said frequency, b) the spatial linear component of the phase of said selected eigenvector at said frequency is extracted and when the magnitude of said linear component is less than said isoplanatic limit said linear component is removed from said phase to produce a modified eigenvector, and the procedure moves to step e), c) when the magnitude of said linear component is between said isoplanatic limit and said quasiplanatic limit, or the order of said selected eigenvector is larger than said order limit, said linear component is removed from said phase and said selected eigenvector is side shifted an amount determined by geometric calculations based on the magnitude and direction of said linear component, the location of the transmit beam focus, and said depth of said thin aberration screen, to produce a modified eigenvector, and the procedure moves to step e), d) the next order eigenvector, ordered according to decreasing eigenvalues, of the correlation matrix of the element signals at said frequency is calculated and selected as the next eigenvector for derivation of the correction filters and the procedure moves to the top of step b), e) wherein the components of said modified eigenvector are used as a basis for the element signal correction filter characteristics for the transmit and/or the receive beams.

4. A method for corrections of wavefront aberrations according to claim 1, wherein a limit value of a linear phase component and an order value of an eigenvector are given, and the correction filter responses for at least one frequency are estimated with the following steps:

a) the $1^{st}$ and $2^{nd}$ eigenvectors (ordered according to decreasing eigenvalues) of the correlation matrix of the received element signals at said frequency are calculated, and the spatial linear components of the phase of said calculated eigenvectors at said frequency are extracted and said eigenvector with a smallest said linear component is selected to form a first selected eigenvector for derivation of the correction filters at said frequency, b) when said spatial linear component of the phase of said selected eigenvector at said frequency is less than said limit value, or the order of said selected eigenvector is larger than said order value, said linear component is removed from the phase of said selected eigenvector to form a modified eigenvector, and the procedure moves to step d), c) the next order eigenvector, ordered according to decreasing eigenvalues, of the correlation matrix of the element signals at said frequency is calculated and the spatial linear component of the phase of said next eigenvector is extracted, and the procedure moves to the top of step b), d) wherein the components of said modified eigenvector are used as a basis for the element signal correction filter characteristics for the transmit and/or the receive beams.

5. A method for corrections of wavefront aberrations according to claim 1, wherein said received element signals are corrected for reverberation noise and said reverberation noise corrected element signals are used for further estimation of the aberration correction filters.

6. A method for corrections of wavefront aberrations according to claim 5, wherein said corrections to reduce reverberation noise include using $2^{nd}$ harmonic components of said received element signals for estimation of the correction filters.

7. A method for corrections of wavefront aberrations according to claim 6, wherein said $2^{nd}$ harmonic components of said received element signals are extracted through correlation between said element signals with $2^{nd}$ harmonic components of the receive beam former output signal.

8. A method for corrections of wavefront aberrations according to claim 1, wherein said element signals are transformed to the frequency domain at selected frequencies, and said eigenvectors are used to define the frequency responses of said correction filters at said selected frequencies as the filter characteristics.

9. A method for corrections of wavefront aberrations according to claim 1, wherein at least one of said transmit and receive correction filters are approximated by amplitude and/or delay corrections, said delay correction being extracted as the phase of said selected eigenvector at said frequency divided by said frequency, and said amplitude correction is obtained as the amplitude of said selected eigenvector at said frequency.

10. A method for corrections of wavefront aberrations according to claim 8, wherein at least one of said transmit and receive correction filters are approximated by amplitude and/or delay corrections, said delay corrections being extracted from a linear approximation to the phase variation over a band in the frequency domain of each eigenvector component, and said amplitude correction is obtained as the average amplitude or power of said eigenvector component over a frequency band.

11. A method for corrections of wavefront aberrations according to claim 1, wherein said transmit and receive correction filters are approximated by amplitude and/or delay corrections and time domain processing of the complex analytic form of the element signals at the center frequency $\omega_0$ of the signals is used to estimate said modified eigenvector at $\omega_0$ where the phases of said modified eigenvector components divided by $\omega_0$ give the correction delays and the amplitudes of said modified eigenvector components give said amplitude corrections.

12. A method for corrections of wavefront aberrations according to claim 11, wherein the calculation of said phases or delays are based on operations in the time domain on the received RF element signals and the Hilbert transforms of said RF element signals.

13. A method for corrections of wavefront aberrations according to claim 12, wherein the Hubert transforms of said RF element signals are approximated by delaying said RF element signals by $\pi/2\omega_0$.

14. A method for corrections of wavefront aberrations according to claim 11, wherein the calculation of said phases or delays are based on operations on the in-phase and quadrature components of said received RF element signals.

15. A method for corrections of wavefront aberrations according to claim 1, wherein said transmit and receive correction filters are approximated by amplitude and/or delay corrections, and the calculations of said phases or delays are done by time domain processing on the RF element signals.

16. A method for corrections of wavefront aberrations according to claim 1, wherein element signals are the outputs of receive sub-aperture generators, wherein the first receive element signals at the inputs of said sub-aperture generators are delayed for standard beam forming based on the assumption of constant propagation velocity (homogeneous delays) before they are summed to sub-aperture element signals.

17. A method for corrections of wavefront aberrations according to claim 1, wherein calculation of said eigenvectors is done through an iterative procedure that involves an iterative step of correlation between said element signals and said receive beamformer output signal corrected with an approximative eigenvector of the prior iterative step.

18. A method for calculation of lower order eigenvectors according to claim 17, wherein at least for some of the iterative steps the projection of said eigenvector estimate onto the subspace spanned by the higher order eigenvectors (associated with larger eigenvalues) is subtracted from said eigenvector estimate to form an improved estimate of said eigenvector at that estimation step that is orthogonal to the higher order eigenvectors.

19. A method for corrections of wave front aberrations according to claim 1, wherein previously estimated correction filters for one or more beams in a neighborhood of the current beam direction are used as a basis for an a priori estimate of the correction filters for said current beam direction, to be used as transmit correction filters of the first transmitted pulses, and as a start point in iterative estimation of said eigenvectors.

20. A method for corrections of wave front aberrations according to claim 19, wherein an a priori estimate in the estimation procedure for the correction filters at one beam direction is found as a combination of the correction filters for neighboring beam direction, said linear combination involving side shifting of said correction filters of said neighbor beams determined by the difference in the directions between said one beam and said neighbor beams.

21. A method for corrections of wave front aberrations according to claim 19, wherein an a priori estimate in the estimation procedure for the correction filters at one beam direction is found as the estimated correction filter for the closest neighbor beam through side shifting given by the direction differences between said one beam and said closest neighbor beam.

22. A method for corrections of wave front aberrations according to claim 1, wherein estimation of the correction filters are done in several iterative steps of corrected transmit pulses, wherein:
  for each iterative step said corrected transmit pulses are corrected by an a priori estimate of said correction filters, and the received element signals from said corrected transmit pulses is used to estimate correction filters according to claim 1,
  said a priori estimate for the first iterative step of said corrected transmit pulses is one of no correction and an a priori correction filter obtained according to claims 19-21, and
  in subsequent iterative steps of said corrected transmit pulses, said a priori estimate is the estimated correction filters from the received element signals from said previous iterative steps of said corrected transmit pulses.

23. An ultrasound imaging instrument with corrections of wave front aberrations for transmit and/or receive beams in tissue, the instrument comprising:
  an ultrasound transducer array with a two-dimensional distribution of elements where the surface dimension of the elements is shorter than a correlation length of the wave front aberrations of the received signal across said array surface;
  a transmit and a receive beam former is connected to the array elements, wherein beam forming is done with homogeneous delay and amplitude corrections of element signals for direction steering and focusing of the transmit and receive beams, based on an assumption of a constant propagation velocity in the tissue according to known methods;
  means for aberration correction filtering of said element signals in addition to said homogeneous delay corrections before, when in receive mode, the aberration corrected element signals are added to the final, corrected receive beam former output signal, and, when in transmit mode, aberration corrected signals are transmitted for each element to form said transmit beam; and
  means for estimation of correction filter characteristics for at least one frequency for each element signal as the components of at least one eigenvector of a correlation matrix of the received element signals at said frequency.

24. An ultrasound imaging instrument according to claim 23, further comprising:
  means for corrections of pulse reverberations in the element signals, wherein said reverberation corrected element signals are used for estimation of said correction filter characteristics.

25. An ultrasound imaging instrument according to claim 23, further comprising:
  means for forming sub-aperture element signals wherein the first received element signals are delayed with homogeneous delays calculated on the assumption of constant propagation velocity in the tissue, before the delay corrected first receive element signals are summed to sub-aperture element signals.

* * * * *